US011026172B2

(12) United States Patent
Asterjadhi et al.

(10) Patent No.: US 11,026,172 B2
(45) Date of Patent: Jun. 1, 2021

(54) IMPLEMENTING WAKE-UP RADIO (WUR) DEVICE COMMUNICATIONS

(71) Applicant: QUALCOMM Incorporated, San Diego, CA (US)

(72) Inventors: Alfred Asterjadhi, San Diego, CA (US); George Cherian, San Diego, CA (US); Bin Tian, San Diego, CA (US); Stephen Jay Shellhammer, Ramona, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 44 days.

(21) Appl. No.: 16/239,479

(22) Filed: Jan. 3, 2019

(65) Prior Publication Data
US 2019/0208470 A1 Jul. 4, 2019

Related U.S. Application Data

(60) Provisional application No. 62/635,307, filed on Feb. 26, 2018, provisional application No. 62/613,737, filed on Jan. 4, 2018.

(51) Int. Cl.
*H04W 56/00* (2009.01)
*H04W 52/02* (2009.01)
(Continued)

(52) U.S. Cl.
CPC ......... *H04W 52/0229* (2013.01); *H04L 69/22* (2013.01); *H04W 52/028* (2013.01);
(Continued)

(58) Field of Classification Search
CPC ........... H04W 52/0229; H04W 52/028; H04W 72/0446; H04W 84/12; H04L 69/22; H04L 1/0061
(Continued)

(56) References Cited

U.S. PATENT DOCUMENTS

2008/0219196 A1\* 9/2008 Ptasinski ............... H04W 76/27
370/311
2008/0285495 A1 11/2008 Wentink et al.
(Continued)

FOREIGN PATENT DOCUMENTS

WO 2016160306 10/2016

OTHER PUBLICATIONS

"PCT Application No. PCT/US2019/012295 International Search Report and Written Opinion", dated Mar. 28, 2019, 15 pages.
(Continued)

*Primary Examiner* — Sai Ming Chan
(74) *Attorney, Agent, or Firm* — DeLizio Law, PLLC

(57) ABSTRACT

This disclosure provides systems, methods and apparatus, including computer programs encoded on computer storage media, for establishing communications with one or more devices. In one aspect, a first device generates a wake-up radio (WUR) frame, the WUR frame including a media access control (MAC) header and a frame check sequence (FCS) having a cyclic redundancy check (CRC) or a message integrity check (MIC). The first device may determine the FCS based, at least in part, on the MAC header and basic service set identifier (BSSID) information associated with the first device. The first device may output the WUR frame for transmission to one or more devices. A second device may receive the WUR frame from the first device and determine whether the WUR frame is directed to the second device based, at least in part, on comparing the FCS of the WUR frame with a calculated FCS.

28 Claims, 17 Drawing Sheets

(51) Int. Cl.
   *H04W 72/04*    (2009.01)
   *H04L 29/06*    (2006.01)
   *H04W 84/12*    (2009.01)
   *H04L 1/00*     (2006.01)
(52) U.S. Cl.
   CPC ....... *H04W 72/0446* (2013.01); *H04L 1/0061* (2013.01); *H04W 84/12* (2013.01)
(58) Field of Classification Search
   USPC .......................................................... 370/311
   See application file for complete search history.

(56) References Cited

U.S. PATENT DOCUMENTS

| | | | |
|---|---|---|---|
| 2014/0112226 A1 | 4/2014 | Jafarian et al. | |
| 2016/0057605 A1* | 2/2016 | Shellhammer | H04W 52/0216 370/311 |
| 2017/0359300 A1* | 12/2017 | Patil | H04L 61/1541 |
| 2018/0192373 A1* | 7/2018 | Fang | H04W 52/0235 |
| 2018/0206193 A1* | 7/2018 | Adachi | H04W 52/0235 |
| 2019/0069176 A1* | 2/2019 | Huang | H04L 9/3228 |
| 2019/0082390 A1* | 3/2019 | Azizi | H04L 5/0053 |
| 2019/0281551 A1* | 9/2019 | Kim | H04W 28/06 |
| 2019/0349857 A1* | 11/2019 | Kim | H04W 48/10 |

OTHER PUBLICATIONS

Asterjadhi, Alfred, "Considerations on WUR frame format", Sep. 19, 2017, 26 pages.

\* cited by examiner

IMPLEMENTING WAKE-UP RADIO (WUR) DEVICE COMMUNICATIONS

CROSS-REFERENCE TO RELATED APPLICATIONS

This Patent Application claims priority to U.S. Provisional Patent Application No. 62/613,737, filed Jan. 4, 2018, and U.S. Provisional Patent Application No. 62/635,307, filed Feb. 26, 2018. The disclosure of the prior Applications is considered part of and is incorporated by reference in this Patent Application.

TECHNICAL FIELD

The present application relates generally to wireless communications, and more specifically to systems, methods, and devices for implementing communications with wake-up radio (WUR) devices.

DESCRIPTION OF THE RELATED TECHNOLOGY

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (such as circuit switching vs. packet switching), the type of physical media employed for transmission (such as wired vs. wireless), and the set of communication protocols used (such as Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, as use of wireless networks increases, power constraints of wireless devices may become increasingly critical. Some devices may include a plurality of radios: one or more "main" radios used for general communications and data transfer on the wireless networks, and a secondary or "wake-up radio (WUR)" for wake-up communications. In some cases, the WUR radio may be the only radio of the device. Specifically, the WUR may provide for communications when the main radio is in a power saving mode, as waking the WUR periodically to monitor communications on the wireless network may be more energy efficient than waking the main radio.

SUMMARY

The systems, methods and devices of this disclosure each have several innovative aspects, no single one of which is solely responsible for the desirable attributes disclosed herein.

One innovative aspect of the subject matter described in this disclosure can be implemented by a first device for establishing communication with one or more devices. The first device may generate a wake-up radio (WUR) frame. The WUR frame may include a media access control (MAC) header, and a frame check sequence (FCS) having a cyclic redundancy check (CRC) or a message integrity check (MIC). The FCS may be determined based, at least in part, on the MAC header and basic service set identifier (BSSID) information associated with the first device. The first device may output the WUR frame for transmission to the one or more devices.

In some implementations, the FCS may include the CRC when the WUR frame is an unprotected frame.

In some implementations, the FCS may include the MIC when the WUR frame is a protected frame.

In some implementations, the first device may determine the FCS based, at least in part, on the MAC header and the BSSID information associated with the first device. The BSSID information used for determining a value of the FCS may not be included in the WUR frame that is outputted for transmission. The first device may output the WUR frame for transmission to the one or more devices. The WUR frame may include the MAC header and the FCS.

In some implementations, the first device may determine the CRC or the MIC based, at least in part, on the MAC header. The first device may determine the FCS based, at least in part, on the CRC or the MIC and the BSSID information associated with the first device. The first device may output the WUR frame for transmission to the one or more devices. The WUR frame may include the MAC header and the FCS.

Another innovative aspect of the subject matter described in this disclosure can be implemented by a first device having a WUR for establishing communications. The first device may receive, via the WUR, a WUR frame from a second device. The WUR frame may include a MAC header, and an FCS having a CRC or an MIC. The FCS may be determined by the second device based, at least in part, on the MAC header and BSSID information associated with the second device. The first device may determine whether the WUR frame is directed to the first device based, at least in part, on comparing the FCS of the WUR frame with a calculated FCS.

In some implementations, the first device may determine the calculated FCS based, at least in part, on the MAC header of the WUR frame and stored BSSID information that is stored at the first device.

In some implementations, the first device may determine whether the FCS of the WUR frame matches the calculated FCS by comparing the FCS of the WUR frame with the calculated FCS. The first device may determine the WUR frame is directed to the first device in response to determining the FCS of the WUR frame matches the calculated FCS. The first device may determine the WUR frame is not directed to the first device in response to determining the FCS of the WUR frame does not match the calculated FCS.

In some implementations, the first device may determine the CRC or the MIC based, at least in part, on the MAC header of the WUR frame. The first device may generate the calculated FCS based, at least in part, on the CRC or the MIC and the stored BSSID information. The first device may determine whether the FCS of the WUR frame matches the calculated FCS by comparing the FCS of the WUR frame with the calculated FCS. The may determine the WUR frame is directed to the first device in response to determining the FCS of the WUR frame matches the calculated FCS.

The first device may determine the WUR frame is not directed to the first device in response to determining the FCS of the WUR frame does not match the calculated FCS.

Another innovative aspect of the subject matter described in this disclosure can be implemented by a first device including a processor and an interface. The processor may be configured to generate a WUR frame. The WUR frame may include a MAC header, and an FCS having a CRC or an MIC. The FCS may be determined based, at least in part, on the MAC header and BSSID information associated with the first device. The interface may be coupled with the processor. The interface may be configured to output the WUR frame for transmission to one or more devices.

Another innovative aspect of the subject matter described in this disclosure can be implemented by a first device including a WUR and a processor. The WUR may be configured to receive a WUR frame from a second device. The WUR frame may include a MAC header, and an FCS having a CRC or an MIC. The FCS may be determined by the second device based, at least in part, on the MAC header and BSSID information associated with the second device. The processor may be coupled with the WUR. The processor may be configured to determine whether the WUR frame is directed to the first device based, at least in part, on a comparison of the FCS of the WUR frame with a calculated FCS.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
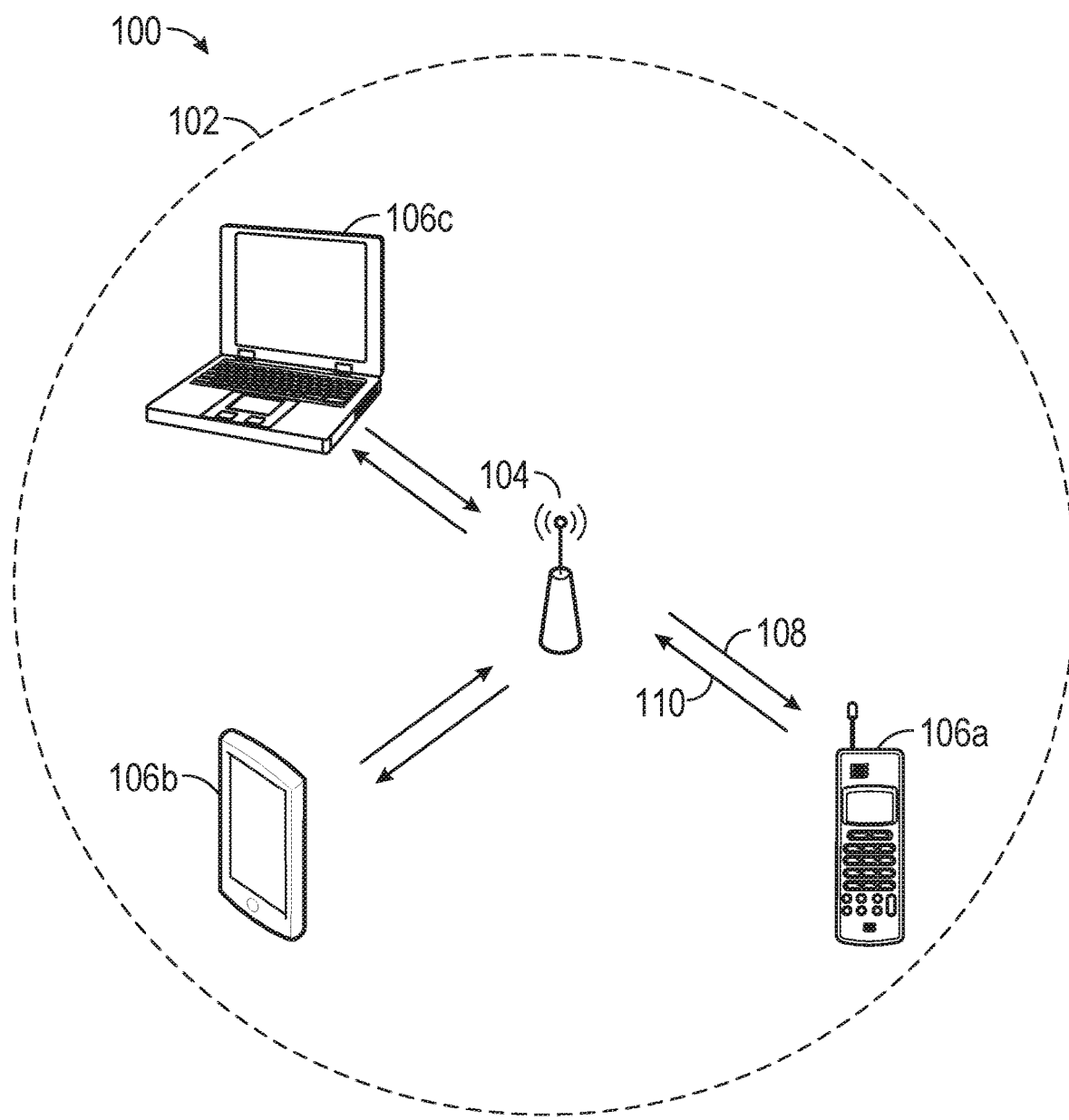
FIG. 1 illustrates an example of a wireless communication system in which aspects of the present disclosure may be employed.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the Institute of Electrical and Electronics Engineers (IEEE) 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols, such as the IEEE 802.11ba protocols.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, a watch, etc. In an example, a STA connects to an AP via a WiFi (such as an IEEE 802.11 protocol) compliant wireless link to obtain general connectivity to the Internet or to other wide area networks. In some implementations, a STA also may be used as an AP.

The teachings herein may be incorporated into (such as implemented within or performed by) a variety of wired or wireless apparatuses (such as nodes). In some aspects, a wireless node implemented in accordance with the teachings herein may include an access point or an access terminal.

An AP may include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RB S"), or some other terminology.

A STA also may include, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (such as a cellular phone or smartphone), a computer (such as a laptop), a portable communication device, a headset, a portable computing device (such as a personal data assistant), an entertainment device (such as a music or video device, or a satellite radio), a gaming device or system, a global positioning system device, or any other suitable device that is configured to communicate via a wireless medium.

APs and STAs of a network may generate and transmit a wake-up radio (WUR) communication to another device in the network (such as another AP or STA). For example, an AP may generate and transmit a WUR communication to a STA. The WUR communication may be a WUR frame that is directed to the WUR of the STA in order to not wake up the main radio of the STA. In some implementations, the AP may hide, hash, scramble, or mask BSSID information associated with the AP in a frame check sequence (FCS) of the WUR frame when generating the value of the FCS. In some implementations, the AP may generate the FCS of the WUR frame based, at least in part, on a media access control (MAC) header and the BSSID information associated with the AP. After generating the WUR frame, the AP may transmit the WUR frame to one or more devices in the network. The transmitted WUR frame may include at least the MAC header and the FCS. The BSSID information that is used for determining the value of the FCS may not be included in the transmitted WUR frame. The STA may receive the WUR frame from the AP and determine whether the WUR frame is directed to the STA or to another device of the network. The STA may use stored BSSID information previously received form the AP to determine whether the WUR is directed to the STA.

Particular implementations of the subject matter described in this disclosure can be implemented to realize one or more of the following potential advantages. Various types of frames that are exchanged between APs and STAs of a network typically include the basic service set identifier (BSSID) information in a separate field or subfield within the frame. Generating and transmitting a WUR frame that does not include the BSSID information in a separate field or subfield within the WUR frame may reduce the size of the frame, reduce transmission overhead, and increase transmission speed. Furthermore, a WUR frame that hides, hashes, scrambles, or masks the BSSID information in the FCS of the WUR frame may improve privacy and security.

FIG. 1 is a diagram of an example wireless communication system 100 in which aspects of the present disclosure may be employed. The wireless communication system 100 may operate pursuant to a wireless standard, for example a high-efficiency (HE) 802.11 standard, high throughput (HT) 802.11 standard, a very high throughput (VHT) standard, extreme high throughput (EHT) standard, or any other wireless communication standard. The wireless communication system 100 may include an AP 104, which communicates with STAs 106 (referring generally to the STAs 106A-106C).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. This communication link may be established via a single-input-single-output (SISO), multiple-input-single-output (MISO), single-input-multiple-output (SIMO), or a multiple-input-multiple output (MIMO) system.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It is noted that the wireless communication system 100 may not have a central AP 104, but rather may function as a peer-to-peer network (such as TDLS, WiFi-Direct) between the STAs 106. Accordingly, the functions of the AP 104 described herein may alternatively be performed by one or more of the STAs 106.

In some aspects, a STA 106 may associate with the AP 104 in order to send communications to or receive communications from the AP 104. In one aspect, information for associating is included in a broadcast by the AP 104. To receive such a broadcast, the STA 106 may, for example, perform a broad coverage search over a coverage region. A search also may be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN). In some aspects, the STA 106 may already be associated with AP 104 and may periodically monitor the communications from the AP 104 for communications directed to the STA 106.

In some implementations, one or more of the STAs 106 of the BSA 102 may include a plurality of radios. For example, these STAs may include a "main" radio that is used to perform communications within wireless communication system 100 and the low power radio or "wake-up radio (WUR)" that is used to monitor for "wake-up" or similar low power communications from the AP 104 when the STA 106 is in a low power or power saving mode. In some implementations, the STAs 106 may only include the WUR radio. In some implementations the STA may include more than one main radio, each of which may operate in different bands (such as 2.4, 5, 6, 18, and 60 GHz) or with different wireless technologies (such as LTE, Bluetooth, and 802.11). The STAs 106 including the WUR radio may be designated as WUR STAs. The WUR may be a transmitter and receiver circuit with minimal capabilities (such as minimal compatibility with communication frequencies and speeds) for communication over the communication system 100. In some implementations, the WUR may include fewer features than the main radio, for example lack of advanced encoder/decoder capabilities, etc. Accordingly, the WUR may be lower in cost than the main radio and also may consume less power than the main radio when in operation. Thus, the WUR may be used to monitor for communications to the STA more efficiently than using the main radio of the STA. In some cases, the WUR radio may be operating in a different channel/band compared to the one or more main radios. The WUR may be configured to receive instructions from the AP 104 (or other devices broadcasting on the wireless communication system 100). These instructions may include instructions to "wake-up" the main radio or perform other actions that do not activate the main radio.

In some implementations, the AP 104 and the STAs 106 may be configured to generate various WUR communications for WUR devices. For example, the AP 104 and the STAs 106 may be configured to synchronize devices based on a WUR beacon transmission. Additionally, or alternatively, the AP 104 and the STAs 106 may transmit unicast WUR messages to wake up a single WUR STA, or multicast/broadcast WUR messages to wake up multiple or all WUR STAs. The AP 104 and the STAs 106 may be configured to generate and transmit WUR Beacon frames/messages, WUR control frames/messages, etc. Similarly, the WUR STAs may be configured to perform various operations based on the received WUR communications. For example, the WUR STAs may synchronize based on WUR Beacon reception that includes timing information, wake up based on an individual or multicast/broadcast wakeup message, activate lights or perform actions, etc.

WUR communications may be generally based on typical IEEE 802.11 communication structures. For example, communication frames may include preambles, addressing information, control information, and frame check information. However, the IEEE 802.11 communication structures may be customized for WUR communication (such as WUR physical layer convergence procedure (PLCP) protocol data units (PPDUs)) in order to reduce or minimize overhead and maintain signaling of essential information to enable various operations. In some implementations, the WUR PPDUs may provide flexibility for a wide range of use cases and scenarios.

Figure 2:
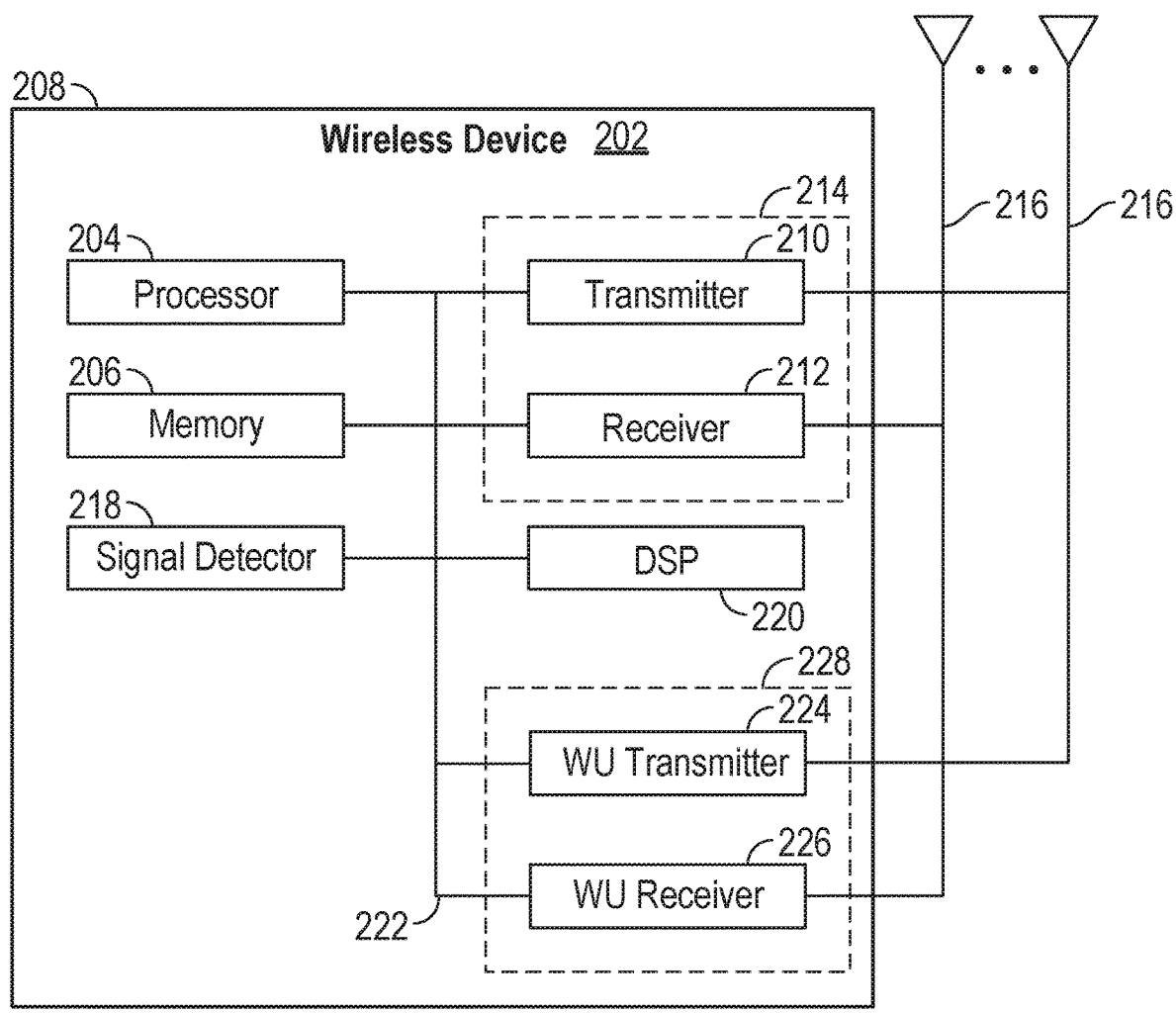
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100 of FIG. 1. The wireless device 202 is an example of a device that may be configured to implement the various methods described herein, and may be compliant with the IEEE 802.11ba standard. The wireless device 202 may implement a WUR AP or a WUR STA. In some implementations, the wireless device 202 may implement an AP 104 or a STA 106.

The wireless device 202 may include a processor 204 which controls operation of the wireless device 202. The processor 204 also may be referred to as a central processing unit (CPU). Memory 206, which may include both read-only memory (ROM) and random-access memory (RAM), provides instructions and data to the processor 204. A portion of the memory 206 also may include non-volatile random-access memory (NVRAM). The processor 204 may perform logical and arithmetic operations based on program instructions stored within the memory 206. The instructions in the memory 206 may be executable to implement the methods described herein.

The processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system also may include machine-readable media for storing software. Software shall be construed broadly to mean any type of instructions, whether referred to as software, firmware, middleware, microcode, hardware description language, or otherwise. Instructions may include code (such as in source code format, binary code format, executable code format, or any other suitable format of code). The instructions, when executed by the one or more processors, cause the processing system to perform the various functions described herein.

The wireless device 202 also may include a housing 208 that may include a transmitter 210 and a receiver 212 to allow transmission and reception of data between the wireless device 202 and a remote location or device. The transmitter 210 and receiver 212 may be combined into a transceiver 214. A single or a plurality of transceiver antennas 216 may be attached to the housing 208 and electrically coupled to the transceiver 214. The wireless device 202 also may include multiple transmitters (such as WUR transmitter 224), multiple receivers (such as WUR receiver 226), and multiple transceivers (such as WUR transceiver 228). The transceiver 214 and the WUR transceiver 228 also may operate as an interface (also referred to as a network interface) to communicate with other devices in the network.

The wireless device 202 also may include a signal detector 218 that may be used in an effort to detect and quantify the level of signals received by the transceiver 214 or the transceiver 228. The signal detector 218 may detect such signals as total energy, energy per subcarrier per symbol, power spectral density and other signals. The wireless device 202 also may include a digital signal processor (DSP) 220 for use in processing signals. In some aspects, the wireless device also may include user interface components (not shown) and a wireless LAN (WLAN) modem (not shown). The WLAN modem may provide for communications using one or more WiFi technologies, such as any of the IEEE 802.11 protocol standards.

The various components of the wireless device 202 may be coupled together by a bus system 222, which may include a power bus, a control signal bus, and a status signal bus in addition to a data bus.

Certain aspects of the present disclosure support transmitting an uplink (UL) signal or a downlink (DL) signal between one or more STAs, WUR STAs, APs, and WUR APs. In some implementations, the signals may be transmitted in a multi-user MIMO (MU-MIMO) system. Alternatively, the signals may be transmitted in a multi-user FDMA (MU-FDMA) or similar FDMA system. In some aspects, these signals may be transmitted using one or more of the transmitter 210 and the WUR transmitter 224.

In some implementations, the WUR transmitter 224, the WUR receiver 226, and the WUR transceiver 228 may be configured to communicate with limited or minimal power consumption. Accordingly, the WUR transmitter 224, the WUR receiver 226, and the WUR transceiver 228 may be limited to operation at specific frequencies or bandwidths. For example, the WUR transmitter 224, the WUR receiver 226, and the WUR transceiver 228 may be configured to operate at one of 900 MHz, 2.4 GHz, 5.0 GHz, 6 GHz, 18 GHz or 60 GHz frequency bands at speeds of 62.5 Kbps or 250 Kbps, although not limited to these frequencies or speeds. In some implementations, the WUR devices may be limited to operation in heavy utilized the industrial, scientific, and medical (ISM) radio bands. Based on such speeds and limitations, transmitting even a limited number of bytes would take a significant amount of time. As an example, transmitting seven (7) bytes of information may utilize ~1 ms transmission time assuming a speed of 62.5 kbps.

Furthermore, the WUR devices (such as WUR APs and WUR STAs) may be configured such that the corresponding radio systems operate in one of four states at any given time. For example, in a first state, both the WUR transceiver 228 and the transceiver 214 are off. In a second state, the WUR transceiver 228 is on while the transceiver 214 is off. In a third state, the WUR transceiver 228 is off while the transceiver 214 is on. In a fourth state both are on. And the number of states may increase proportionally with the number of main radios which may be greater than one. The WUR transmitter 224, the WUR receiver 226, the WUR transceiver 228, the transmitter 210, the receiver 212, and the transceiver 214 may share the same one or more antennas 216 and may operate in the same band or may operate in separate bands. Accordingly, the corresponding WUR components and "main radio" components may be configured to operate only one at a time so that only WUR communications or main radio communications are being transmitted/received at any given moment. In some implementations, when the device 202 includes multiple antennas 216 coupled to the WUR transmitter 224, the WUR receiver 226, the WUR transceiver 228, the transmitter 210, the receiver 212, and the transceiver 214, the processor 204 may be configured to dedicate one or more antennas 216 to the WUR transmitter 224, the WUR receiver 226, and the WUR transceiver 228, and one or more of the remaining 216 antennas to the transmitter 210, the receiver 212, and the transceiver 214 to allow simultaneous WUR and main channel communications. The STA also may turn off the WUR radio and allocate all antennas to the main radio.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 or the DSP 220. Further, each of the components illustrated in FIG. 2 may be implemented using a plurality of separate elements. Additionally, additional components not illustrated in FIG. 2 may be included in any of the devices 202.

The wireless device 202 may include the AP 104 or the STA 106, and may be used to transmit or receive communications. That is, either the AP 104 or the STA 106 may serve as transmitter or receiver devices. Certain aspects contemplate signal detector 218 being used by software running on memory 206 and processor 204 to detect the presence of a transmitter or receiver.

Figure 3:
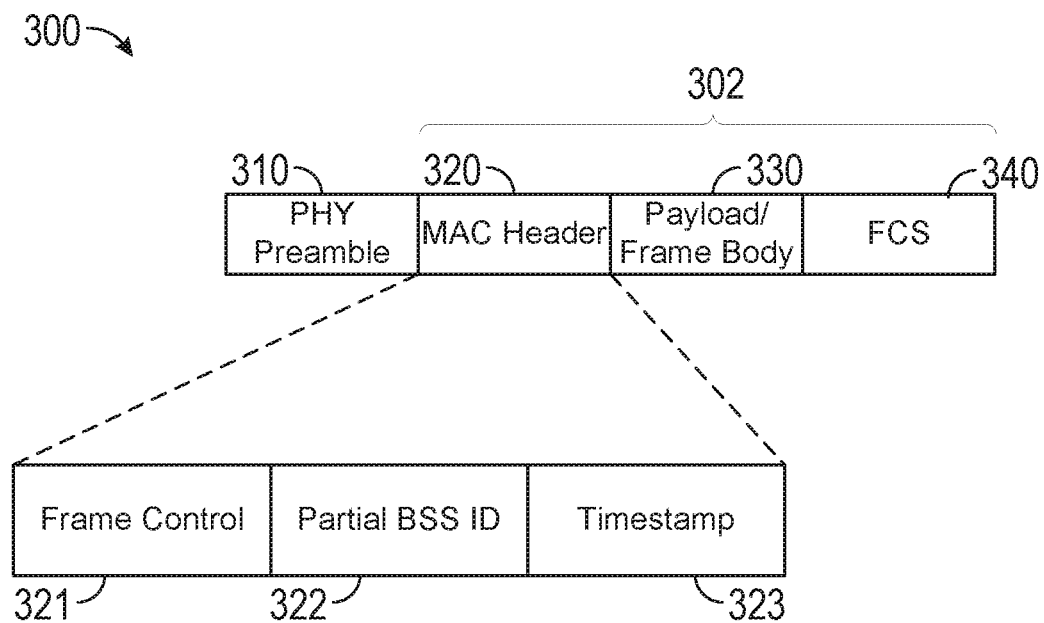
FIG. 3 illustrates an example structure of a physical layer convergence procedure (PLCP) protocol data unit (PPDU) for communicating with a wake-up radio (WUR) device.

FIG. 3 illustrates an example structure of a PPDU 300 for communicating with a WUR device 202 (FIG. 2). The four portions of the PPDU 300 illustrated are a PHY Preamble 310 portion, media access control (MAC) header 320 portion, a payload or frame body portion 330 (payload or frame body portion 330 may be used interchangeably), and a frame check sequence (FCS) 340 portion. The PHY preamble 310 is a portion of the PPDU 300 preamble that contains information for decoding the one or more PLCP service data unit (PSDU) or MAC protocol data unit (MPDU) 302 contained in the PPDU 300. More than one PSDUs or MPDUs may be contained in a PPDU that is sent in MU mode (such as using OFDMA multiplexing techniques). The MPDU 302 of the PPDU 300 may include one or more of a MAC header 320, payload or frame body portion 330, and FCS 340. The MAC header 320 may include one or more common fields that are present in all WUR frames or PPDUs 300. The payload or frame body portion 330 may include one or more frame type specific fields that may be present in select PPDUs 300 (such as based on the type of PPDU 300). In some implementations, the payload or frame body portion 330 may be optional in the PPDU 300, for example, based on a type of the WUR frame or based on an indication contained in the WUR frame. In some implementations, the FCS 340 may be used to detect if the MPDU 302 contains any errors or if the MPDU 302 is generated from an access point of an overlapping BSS. The FCS 340 may include cyclic redundancy check (CRC) or message integrity check depending on the type of PPDU 300 received (such as the CRC may be present if the frame is not secure, and the MIC may be present if the frame is secured). The FCS 340 may be 8 bits, 16 bits, or any other number of bits in length and may contain one or more bits of a CRC-8, CRC-16, or CRC-32. For example, when communicated with unprotected frames, the FCS 340 may carry a CRC having a length of 8 bits, 16 bits, 24 bits, or 32 bits. In some implementations, the FCS 340 may have a variable length. For example, the size of the FCS 340 may depend on whether the WUR frame is protected or not (such as whether or not the WUR frame contains CRC or MIC). In some implementations, the size of the FCS 340 may depend on the type of the WUR frame. In some implementations, the MAC header 320 and the FCS 340 constitute a minimal WUR frame format and are present in all WUR frames, including reserved types. In some implementations, the FCS 340 may include a message integrity check (MIC), which may be computed in a manner similar to the CRC as described herein. According, the CRC as described herein may be replaced with the MIC.

A size of the FCS 340 may directly impact a probability of false alarms generated by the corresponding MPDU 302. For example, a smaller FCS size may cause or result in a STA 106 receiving the frame containing the FCS 340 and the MPDU 302 to mistakenly interpret the MPDU 302 as being directed to the STA 106 even if the MPDU 302 contains an error or is generated by an AP 104 from an overlapping BSS. However, an FCS 340 having a smaller size (such as smaller number of bits) than a larger FCS 340 may create or cause smaller (or reduced or less) overhead as compared to the larger FCS 340 (such as larger number of bits). The smaller or reduced overhead may be beneficial for short frames (such as constant length frames). For example, a smallest possible MPDU 302 may have a length of 32 bits (4 Bytes) (such as a constant length WUR frame), as will be discussed in further detail below. In some implementations, the MPDU 302 may be up to 12 or 30 Bytes in length (such as a variable length WUR frame), as will be discussed in further detail below. The FCS 340 length may be in addition to the MPDU 302 length. For example, when the WUR frame includes the FCS 340 with a length of 8 bits and the MPDU 302 with a length of 32 bits, the FCS 340 may make up 20% of the overhead. In contrast, the WUR frame that includes the MPDU 302 having the 12 Byte length and the FCS 340 of an 8 bit length, the FCS 340 makes up only 8.3% of the overhead of the WUR frame. Accordingly, in some implementations, where the overhead is of greater concern than potential false alarms, a shorter FCS 340 may be implemented. Where overhead is of less concern than potential false alarms, a longer FCS 340 may be implemented.

In some implementations, the CRC may utilize a polynomial generator that generates one or more polynomials for the CRC. For example, the polynomial generator may generate a 32-bit polynomial. In some implementations, the 32-bit polynomial is used for the CRC to provide baseline MPDU protection. In such implementations, the generator polynomial may be identified by Equation 1 below:

$$G(x)=x^{32}+x^{26}+x^{23}+x^{22}+x^{16}+x^{12}+x^{11}+x^{10}+x^{8}+x^{7}+x^{5}+x^{4}+x^{2}+x+1 \quad \text{Equation 1:}$$

In some implementations, the polynomial generator may generate a 16-bit polynomial. In some implementations, the 16-bit polynomial is used for the CRC of a SIG field of a DSSS PHY. In such implementations, the generator polynomial may be identified by Equation 2 below:

$$G(x)=x^{16}+x^{12}+x^{5}+1 \quad \text{Equation 2:}$$

In some implementations, the polynomial generator may generate an 8-bit polynomial. In some implementations, the 8-bit polynomial is used for the CRC of an MPDU delimiter. In such implementations, the generator polynomial may be identified by Equation 3 below:

$$G(x)=x^{8}+x^{2}+x+1 \quad \text{Equation 3:}$$

Since the WUR radio may be a secondary radio used to wake up or activate a main or primary radio, in some implementations, the polynomial used by the WUR radio may be the same as the polynomial used by the main or primary radio. By using the same polynomial between the WUR radio and the main or primary radio, overall costs and complexity of design may be reduced. Any of the 8-, 16-, or 32-bit polynomials may be implemented, where a higher degree polynomial may give better protection against false positives caused by the CRC. The higher degree polynomials may also result in the use of a longer FCS 340 (such as creating increased overhead and utilizing increased memory).

Various options may provide for reducing overhead while implementing higher degree polynomial protections. For example, in some implementations, only a portion of the calculated CRC may be transmitted or included in the FCS 340, thereby allowing use of a higher degree CRC polynomial without a correspondingly high overhead. In some implementations, the FCS 340 may have a length of 8 bits and include only 8 bits of a calculated CRC-16 (such as including only the 8 most significant bits (MSBs) or 8 least significant bits (LSBs)) and excluding the remaining 8 bits of the CRC-16. Similarly, in some implementations, the FCS 340 may have a length of 8 bits and include only 8 bits of a calculated CRC-32, may have a length of 16 bits and include only 16 bits of a calculated CRC-32, may have a length of 16 bits and include only 16 bits of a calculated CRC-16, may have a length of 8 bits and include 8 bits of a calculated CRC-8, etc. Accordingly, a STA 106 receiving the WUR frame may perform the frame check based on the CRC bits transmitted in the FCS 340, which may be less than the calculated bits.

In a first example, a constant length WUR frame may include an FCS 340 of 8 bit length and a variable length WUR frame may include an FCS 340 of 8 bit length with an additional 8 bits of the CRC-16 contained in the frame body 330 (such as the last 8 bits of the frame body 330). For the constant length frame, the WUR frame may be short and sensitive to overhead as compared to the variable length frame, where the WUR frame is longer and less sensitive or susceptible to increased overhead. While the CRC-16 is described as being used for the WUR frames, any of the CRC polynomials described herein may be used. However, if the polynomial degree is less than the FCS 340 length (such as the FCS 340 length is 16 bits for the CRC-8), then a repletion or padding can be applied to the CRC included in the FCS 340. By such repletion, the calculated bits of the CRC may be repeated in the FCS 340 having a length greater than the CRC calculated bits.

For the constant length WUR frame, the 8 bits of the FCS 340 may carry the 8 MSBs of the CRC-16, while the 8 LSBs of the CRC-16 may be omitted from transmission. Accordingly, a receiver receiving the constant length WUR frame may only perform a frame check on the received 8 bits. For the variable length WUR frame, the 8 LSBs that are omitted from the FCS 340 may instead be included or carried in the frame body 330. Accordingly, the receiver receiving the variable length WUR frame may perform the frame check on the received 16 bits. Therefore, more protection is provided to longer frames (such as the variable length WUR frames.

Note that in this example, the calculated fields (such as the fields that the CRC is protecting) include all fields of the WUR frame up to but not including the FCS 340 itself.

In a second example, the 8 bit FCS 340 of the variable length WUR frame may protect a portion of the MPDU 302 that is the same as what the FCS 340 protects in the constant length WUR frame (such as everything except for the frame body 330). The 8 bits of the CRC included in the frame body 330 may protect contents of the frame body 330 excluding the portion of the frame body 330 that include the remainder of the CRC-16 (such as the frame body 330 length minus 8 bits used for the CRC-16 remainder).

As depicted in FIG. 3, the MAC header 320 may include one or more of the three separate fields: a frame control field 321, a partial basic service set identifier (BSSID) field 322, and a timestamp field 322. Each of the frame control field 321, the partial BSSID field 322, and the timestamp field 322 may have a length of one (1) Byte or octet. In some implementations, some part of the contents of the Frame Control field may be carried in the PHY preamble of the WUR PPDU.

The 1 byte frame control field 321 may provide information that identifies details of the MPDU 302 type and length.

In some implementations, the frame control field 321 may include a type subfield (not shown) and a length/subtype field (not shown). The type subfield may be configured to identify a frame type for the PPDU 300. In some implementations, the type subfield may indicate that the PPDU 300 is a WUR Beacon frame, a WUR control frame, a WUR sync frame, etc.). In some implementations, the frame control may indicate whether the frame is a secure/protected frame or an unsecure/unprotected frame (MIC present or CRC present). For example, a first value in the type subfield may indicate the WUR Beacon frame while a second value in the type subfield may indicate the WUR control frame. In some implementations, the frame type indicated by the type subfield may help differentiate between constant length and variable length PPDUs 300. The length/subtype field may provide information indicating one or both of different frame subtypes or different payload or frame body sizes for the payload or frame body portion 330 of the PPDU 300. In some implementations, as will be described in more detail below, the payload or frame body portion 330 may be integrated with the MAC header portion 320, and the length of the payload or frame body portion 330 may not be indicated in the length/subtype subfield of the frame control field 321, but rather the length of the MAC header, or of the MPDU, or of the variable portion of the MPDU may be indicated by the length specified in the Frame Control field. When the length/subtype field is included, the length may provide lengths for variable length frames. Alternatively, or additionally, the subtype field may provide additional details of subtypes for constant length frames. In some implementations, the frame control field 321 may be moved to the PHY preamble 310 and may be part of a SIG field of the PHY preamble or encoded in the PHY preamble itself.

In some implementations, the constant length frame may not include the payload or frame body portion 330. A WUR frame that includes the payload or frame body portion 330 may be referred to as a variable-length (VL) WUR frame. In some implementations, a constant length WUR frame can be sent to any WUR STA while a variable length WUR frame can be sent to a WUR STA that has declared support of reception of variable length WUR frames.

The partial BSSID field 322 (may optionally be present and may be 1 byte) may provide identification of an identity (such as an ID) of a transmitting BSS. The transmitting BSS may correspond to the BSS from which the WUR communication is transmitted. For example, the partial BSSID field 322 may include a partial address or identifier for the AP 104 or STA 106 that transmitted the PPDU 300. In some implementations, the receive WUR STA may use the partial BSSID field (and the information contained therein) to determine whether or not the WUR STA is a potential intended recipient for the PPDU 300. For example, during association with the AP 104 or the wireless communication system 100, the WUR STA may be assigned or provided with a BSSID for the BSS to which the WUR STA belongs (such as the BSS in the BSA 102). Accordingly, the WUR STA may store the BSSID for its BSS in its memory (such as the memory 206 of FIG. 2). When the WUR STA compares the partial BSSID 322 to the stored BSSID, if the values match, then the WUR STA may determine that the received PPDU 300 does apply to the WUR STA and perform additional checks as described below. However, if the partial BSSID 322 does not match the WUR STA stored BSSID, then the WUR STA may determine that the received PPDU 300 does not apply to the WUR STA and may ignore the remainder of the PPDU 300. Accordingly, the partial BSSID field 322 may be used to reduce computations, processing, and reception of the PPDU 300 by WUR STAB that do not need to pay attention to the PPDU 300. In some implementations, the partial BSSID may be a value that is known by both the AP and STA which may change in time according to a function (such as a random generator with a seed known at both devices) that is known at both the AP and STA.

In some implementations, the partial BSSID 322 field may only include one octet of the BSSID of the transmitting device. In some implementations, the single octet of the BSSID (such as the partial BSSID) is sufficient to provide adequate intra-PPDU power savings and discarding of PPDUs sent by other BSSs (APs) as compared to the added costs (such as time, bandwidth, etc.) of transmitting and processing the full BSSID. Accordingly, the partial BSSID field 322 may provide for reduced accuracy of identifying whether the WUR STA belongs to the same or different BSS as the transmitting AP 104 or STA 106 while providing for reduced communication costs (such as time, bandwidth, etc.). Additionally, the partial BSSID field 322 may be used in some implementations of minimization of false alarms in the FCS, as discussed in further detail below.

The timestamp field 323 (may be 1 byte or 2 bytes in length, if present) may contain a partial timing synchronization function (TSF). The partial TSF may allow the WUR STA to synchronize its clock to match the clock of the transmitting AP 104. The partial TSF also may allow the WUR STA to prevent and avoid replay attacks, as will be described in further detail below.

Figure 4:
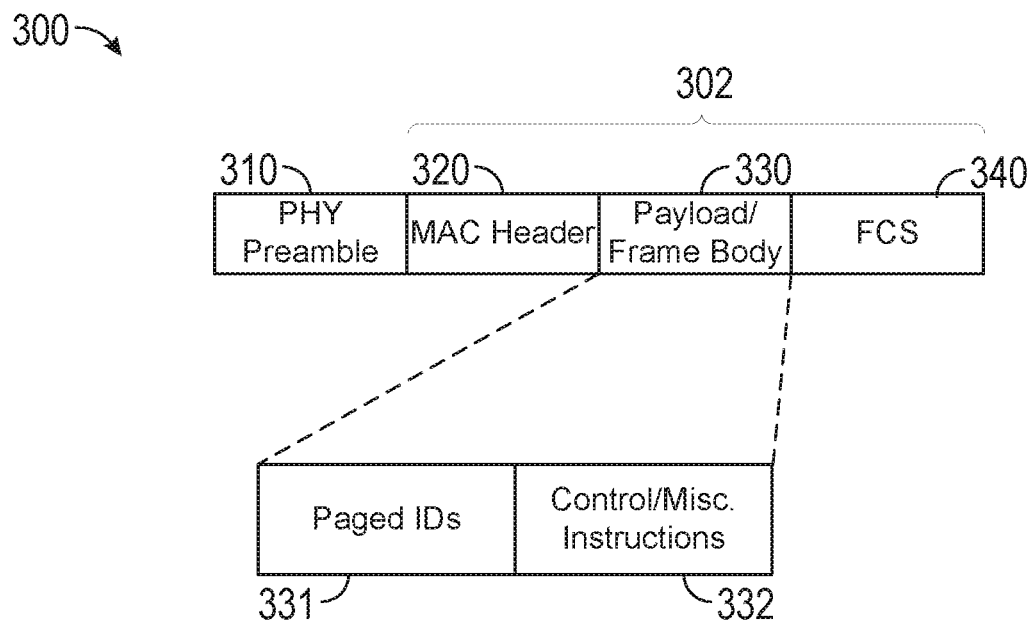
FIG. 4 illustrates further details of the example structure of the PPDU of FIG. 3 for communicating with the WUR device.

FIG. 4 illustrates further details of the example structure of the PPDU 300 of FIG. 3 for communicating with the WUR device 202 of FIG. 2. As depicted in FIG. 4, the payload or frame body portion 330 may include two separate fields: a paged IDs field 331 and control/misc. instructions field 332. The paged IDs field 331 may have a variable byte or octet length and the control/misc. instructions field 332 may have a length of 1 byte or octet. In some implementations, at least one of the paged ID(s) field 331 and the control/misc. instructions field 332 may be part of the MAC header 320.

The paged IDs field 331 (may have one or more paged IDs, each of which may be 1 byte in length) may provide a list of intended receiving WUR STAs of the payload or frame body or of the PPDU 300. In some implementations, the paged IDs field 331 may include identifiers, each of which may identify one STA or be assigned to a group of WUR STAs or identify all WUR STAs associated to the device sending the PPDU 300. The paged IDs field 331 may be used in conjunction with the partial BSSID field 322 of FIG. 3. For example, when a WUR STA determines that the partial BSSID field 322 matches the BSSID of the WUR STA, then the WUR STA may proceed to confirm that the ID of the WUR STA is included in the paged IDs field 331. When the ID of the WUR STA is not included in the paged IDs field 331, then the WUR STA can stop receiving the PPDU 300 and can ignore any received information. On the other hand, if the ID of the WUR STA is included in the paged IDs field 331, then the WUR STA proceeds to receive the remainder of the PPDU 300 and follows any instructions included in the PPDU 300. In some implementations, each paged ID in the paged IDs field 331 may be mixed with a known portion of an identifier of the BSS (such as XORing with certain 8 bits of the BSSID) so that the paged ID values are not concentrated in a certain portion of the range (such as if all APs 104 start allocating IDs in increasing order, then the likelihood that multiple APs assign low values (such as 1, 2, etc.) is high. If APs 104 apply this rule, then paged ID values can be uniformly spread across the 1-255 range). In some implementations, the APs 104 may use a random generator for selecting the paged IDs that they assign to their STAs and the selected paged IDs may be known by all APs that are within its range so that paged IDs assigned by APs 104 in the same area do not coincide.

In some implementations, the paged IDs field 331 may have a length of one byte. With a length of one byte, the paged IDs field 331 may indicate or identify a single WUR STA to or with which the PPDU 300 applies or is associated. The paged IDs field 331 may have a size of up to 16 bytes, allowing the PPDU 300 to apply or be associated with up to 16 different WUR STAs. In some implementations, the length subfield of the frame control field 321 may indicate a number of WUR STAs identified by the paged IDs field 331 and, accordingly, may indicate a number of bytes of the paged IDs field 331. In some implementations, when the length subfield is zero (0), the PPDU 300 may be intended to be a broadcast or multicast PPDU that applies to all WUR STAs or to all WUR STAs sharing the BSSID of the partial BSSID field 322. In such an implementation, the paged IDs field 331 may have a length of zero and may not include any WUR STA identifiers. In some implementations, when the length subfield is 0 for the broadcast PPDU, the pages IDs field 331 may have a length of one (1) byte without including any WUR STA identifiers (for example, may have a value of zero indicating that the frame is broadcast).

The paged IDs subfield 331 of 1 byte length may be used to identify up to 256 unique STA identifiers (or if value 0 is used for broadcast than up to 255 unique STA identifiers) (if the Paged ID is 11 bits then it may be used to identify up to 1024 and so on). However, if the AP 104 serves more than 256 STAs, then the AP 104 may be configured to orthogonally schedule STAs that share the same paged IDs. If the paged IDs are obtained from the association identifier (AID), such as 8 LSBs of the AID provide the Paged ID, then the AP may make such scheduling using one or more of the remaining MSBs of the AID. For example, STAs having an association identifier of "1" and "257" may share the LSB of 0000 0001. Accordingly, if the paged IDs field 331 identifies the STA having the identifier 0000 0001, then both the STA "1" and the STA "257" will determine, based on the partial BSSID field 321 and the paged IDs field 331, that the PPDU 300 is intended for the STA. Accordingly, the STA "1" and the STA "257" may be considered "clones." During association of the STA "1" and the STA "257," the AP 104 may schedule clones to have orthogonal wake times or allocated in orthogonal groups. For example, the STA "1," during association, may be provided to have a scheduled wake times and wake time durations (SPs) such that they do not coincide with the scheduled wake times and wake time durations of STA 257 (such as STA 1 may be scheduled the first 10 ms of a 20 ms wake time duration and STA 257 may be scheduled the second 20 ms of a wake time duration). Accordingly, the clone STAs (such as the WUR STAs having the same LSB identifiers or paged ID) will not wake up simultaneously and unintended WUR STAs will not be awakened just because they share an LSB identifier of paged ID with an intended WUR STA.

Alternatively, or additionally, a most significant bit (MSB) of the identifier for the paged IDs may be masked in one or more other fields of the PPDU 300 or the MPDU 302. For example, the paged IDs in the paged IDs field 331 may be associated with between one and four groups of MSBs. For example, for the STA "1" and the STA "257," the STAs will be associated with two groups of MSBs. The STA "1" will be associated with an MSB of "0" while the STA "257" will be associated with an MSB of "1." Accordingly, the MSB identifiers may be communicated to the WUR STA to allow the WUR STA to determine if the PPDU is intended for it or for another WUR STA having the same LSB identifier in the paged ID field 331.

In some implementations, the AP 104 may desire to send instructions or page more than 16 WUR STAs. In such an implementation, the AP 104 may send a multicast or broadcast PPDU 300 (for example, having the length of 0, as described herein). Alternatively, or additionally, the AP 104 may transmit back-to-back (consecutive) WUR PPDUs 300. When multiple PPDUs 300 are transmitted back-to-back, the AP 104 may include STA identifiers in the paged IDs field 331 in only ascending order, which may allow STAs to know when they will not be paged in later PPDUs 300. For example, when a first PPDU 300 of two or more back-to-back PPDUs 300 includes paged IDs for WUR STA 1, 3, and 8, the WUR STA 5 may know that later PPDUs 300 of the two or more back-to-back PPDUs 300 will not page the STA 5 because the lowest WUR STA that can be paged by subsequent PPDUs 300 is 9 (for example, the STA identifiers only ascend between PPDUs). Such an ascending order may allow WUR STAs to optimize their sleep patterns by determining when they will not be paged without having to wait for all back-to-back PPDUs 300 from being received and reviewed. In some implementations, one or more bits may be included in the MPDU 302 to indicate that a train of one or more other PPDUs 300 is following the current PPDU 300.

The control/misc. instructions field 332 may include one or more instructions for the one or more paged IDs identified in the paged IDs field 331. In some implementations, the control/misc. instructions field 332 may provide special instructions for the WUR STA(s) to perform once they are awakened. In some implementations, the control/misc. instructions field 332 may include special commands if the PPDU 300 is used for controlling external states. In some implementations, the special commands may instruct which main radio to turn on (such as by identifying a radio number, technology, or band). In some implementations, the special commands may indicate which bandwidth to use or may specify one or more receive or transmit parameters.

In some implementations, the one or more control/misc. instructions field 332 may be common to all of the identified WUR STAs in the paged IDs field 331. In some implementations, one or more of the identified WUR STAs in the paged IDs field 331 may have unique instructions from others of the identified WUR STAs in the paged IDs field 331. The association of WUR STAs to particular control instructions may be identified in the frame control field 321, for example, the length subfield. For example, the length subfield may indicate that each identified WUR STA has a respective control instruction field. In this implementation, the length subfield may provide the length of both page IDs and control IDs (such as the unit of the length subfield may be 2 bytes because one paged ID may be one byte and one control ID one byte) and the length will have a range between 2 and 14 bytes. Other lengths for the length subfield in the frame control field 321 may be used (such as 3 or 4 or more).

In some implementations, the two byte paged ID and control field may include a combination of AID identifier bits and control/misc. instructions bits. For example, the two byte paged ID and control field may include 12 AID identifier bits and 4 control/misc. instructions bits. In some implementations, the combination may be 8 AID identifier bits and 8 control/misc. instructions bits. In some implementations, the various combinations of the AID identifier bits and the control/misc. instructions bits are negotiated in advance between the AP 104 and the WUR STA. In some implementations, the combination of AID identifier bits and the control/misc. instructions bits may be vendor specific (such as different vendors may have different numbers of AIDs identifier bits and different numbers of control/misc. instructions bits, etc.).

In some implementations, the commands or instructions associated with the control/misc. instructions bits may be negotiated in advance between the AP 104 and the WUR STA. For example, these bits and the corresponding instructions may be negotiated during association of the WUR STA with the AP 104. For example, the control/misc. instructions bits may be stored in a table-type format with each bit corresponding to a particular action, command, or instruction.

Figure 5:
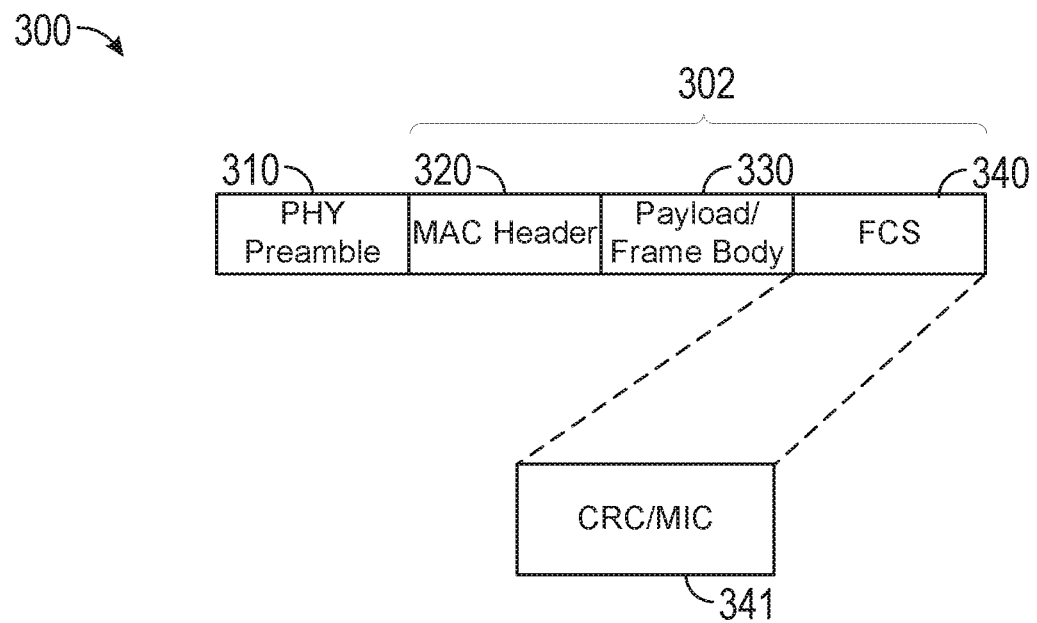
FIG. 5 illustrates further details of the example structure of the PPDU of FIG. 3 for communicating with the WUR device.

FIG. 5 illustrates further details of the example structure of the PPDU 300 of FIG. 3 for communicating with the WUR device 202 of FIG. 2. As depicted in FIG. 5, the FCS 340 may be a two byte portion that includes a cyclic redundancy check (CRC) or a message integrity check (MIC). The CRC may be used to detect errors in unsecured PPDUs 300. The MIC may be used to detect errors and replay attacks in secure PPDUs 300.

In some implementations, the AP 104 may logically combine the FCS 340 with portions of the BSSID of the AP 104 or known sequences prior to transmission of the PPDU 300. For example, the AP 104 may XOR the FCS with the two LSBs of the 3 MSBs of the BSSID of the AP 104. Since the BSSID of the AP 104 is known to the associated STAs from the initial association process, when the FCS is decoded by the receiving WUR STAs, successful decoding may mean that the WUR STA is receiving the PPDU 300 that was generated by the AP 104 of the WUR STA. For WUR STAs that belong to a different BSSID than the transmitting AP 104, the PPDU 300 may be decrypted as being corrupted. In some implementations, the AP 104 may compute the CRC and the MIC assuming that the BSSID is present in the PPDU 300 (such as immediately after the FCS or prior to the FCS) and may omit it from transmission (for example, compute but do not transmit). The receiver, when it receives the PPDU 300, may check the FCS or MIC under the assumption that the BSSID was present (such as the MAC address of the AP transmitting the PPDU 300).

In some implementations, the CRC/MIC fields of the FCS 340 may be used to ensure that WUR STAs are not woken up by PPDUs from an attacker or non-friendly AP 104. For example, a security protocol with low overhead may be used to avoid CCMP-like signaling, where the MIC has 8 or 16 bytes and the CCMP header has 8 bytes. Accordingly, the PPDUs 300 or MPDUs 302 may be unsecure when the FCS 340 contains the CRC and secure when the FCS 340 contains the MIC. In some implementations, the frame control field 321 may be used to signal whether CRC or MIC is used for a particular PPDU 300 or MPDU 302.

In some implementations, the MIC computation may be based on the entire MPDU 302. For example, the MPDU 302 may be intended for a single WUR STA or a plurality of WUR STAs. In some implementations, the MIC is generated by the AP 104 based on a group key known by both AP and the one or more WUR STAs. The group key may be known by all STAs associated with the AP 104 that are intended receivers for the PPDU 300. In some implementations, the timestamp field 323 may provide part of a monotonically increasing counter. For example, an absolute TSF timer at the WUR STA may be updated based on the partial TSF of the timestamp field 323. The absolute TSF timer may be used as an input parameter for the MIC computation, which may be further used to protect the WUR STA from replay attacks.

In some implementations, the MPDU 302 may have a minimum length and a maximum length. The length may be signaled or determined based on a frame type of the PPDU 300 (such as in the frame control field 321, as described herein). For example, the MPDU 302 may have a minimum length of six (6) bytes. The MPDU 302 may include one or more of the following fields: the frame control field 321 of 1 byte, the partial BSSID field 322 of 1 byte, the timestamp field 323 of 1 byte, the control/misc. instructions field 322, and the CRC/MIC field 341 of 2 bytes. In some implementations, as described above, the MPDU 302 may have a minimum length of seven (7) bytes when the frame control fields 321 indicates no length (such as no paged IDs) but where the paged IDs field 331 is included with a length of 1 byte but a zero value. In some implementations, constant length PPDUs 300 may have minimum MPDU 302 sizes of 6 or 7 bytes. The minimum sized MPDUs 302 may utilize ~1 ms of time to transmit at 62.5 Kbps.

The MPDU 302 may have a maximum length of twenty-two (22) bytes. For example, the MPDU 302 may include the minimum 6 bytes described above and then also include 16 bytes for 16 identifiers in the paged ID field 331. Thus, the maximum length for the MPDU 302 may be the 6 bytes of the non-paged IDs fields plus the maximum of 16 bytes for the paged IDs field 331. In some implementations, variable length PPDUs 300 may be signaled or determined based on the frame type and length in the frame control field 321. The maximum MPDU 302 length of 22 bytes may use ~3 ms of transmission time at 62.5 Kbps. In some implementations, the MPDU 302 may have a length anywhere between 6 bytes and 22 bytes.

Figure 6:
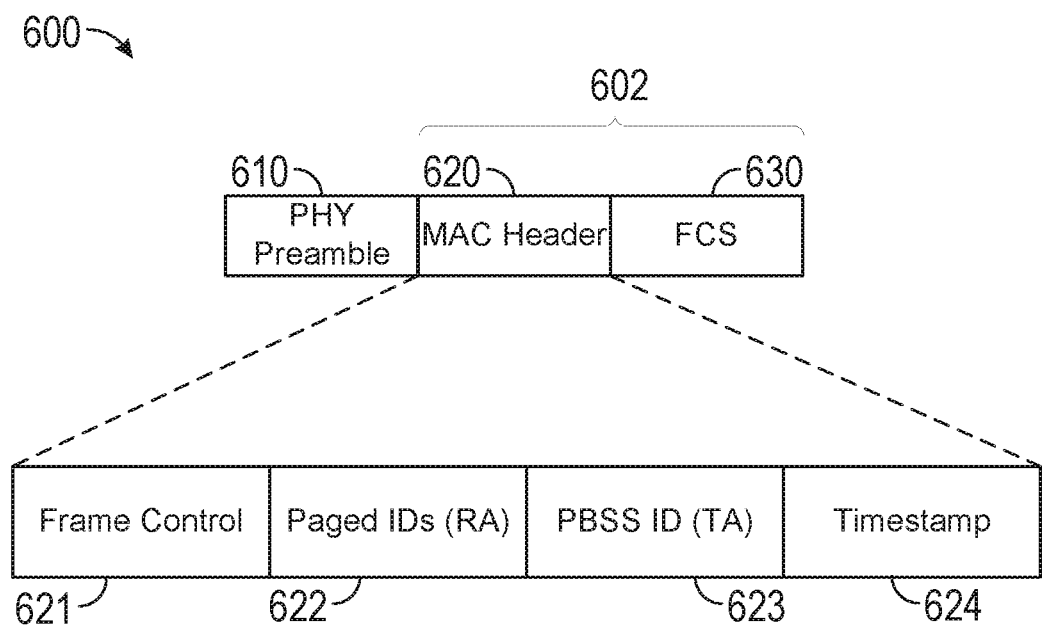
FIG. 6 illustrates another example structure of a PPDU for communicating with the WUR device.

FIG. 6 illustrates another example structure of a PPDU 600 for communicating with the WUR device 202 (FIG. 2). The three portions of the PPDU 600 illustrated are a PHY Preamble 610 portion, a media access control (MAC) header 620 portion, and an FCS 630 portion. The PHY preamble 610 is a portion of the PPDU 600 preamble that contains information for decoding the one or more PSDUs or MPDUs 602 contained in the PPDU 600. More than one MPDU 602 may be contained in a PPDU 600 that is sent in MU mode (such as using OFDMA multiplexing techniques). The MPDU 602 contained in the PPDU 600 may include one or more of the MAC header 620 and the FCS 630. The MAC header 620, as compared to the MAC header 320, may include one or more common fields that are present in all PPDUs 600 or it may include one or more type specific fields that may not be present in every WUR PPDU 600. Accordingly, in some implementations, the contents of the MAC header 620 may depend on a type of WUR PPDU frame in which the MAC header 620 is included. The FCS 630 may include cyclic redundancy check (CRC) or message integrity check (MIC), depending on the type of WUR PPDU frame received (such as the CRC may be present if the PPDU 600 is not secure, and the MIC may be present if the PPDU 600 is secured). No payload or frame body portion may exist in the PPDU 600, as the PPDU frames do not carry any payloads and the type specific fields may not be included in the MAC header 620 portion. Other aspects of communicating the PPDU 600 (such as speeds, frequency bands, etc.) may be similar to those described above in relation to FIG. 3 and the PPDU 300.

As depicted in FIG. 6, the MAC header 620 may include one or more of four separate fields: a frame control field 621, a paged IDs (RA) field 622, a partial BSSID (TA) field 623, and a timestamp field 624. The frame control field 321 may have a length of one (1) byte or octet. The paged IDs (RA) field 622, partial BSSID (TA) field 623, and timestamp field 624 may have lengths not fully established but estimated as described below. In some implementations, some part of the contents of the frame control field 621 may be carried in the PHY preamble of the PPDU 600.

The 1 byte frame control field 621 may provide information that identifies details of at least one of the MPDU 602 type and length. In some implementations, the frame control field 621 may include a one bit protocol version field (not shown), where zero (0) is currently used and one (1) is saved for future development. The frame control field 621 also includes a type subfield of a two bit length. The type a type subfield (not shown) may identify a type of PPDU 600 frame. In some implementations, the type subfield may indicate that the PPDU 600 is a WUR Beacon frame, a WUR control frame, a WUR sync frame, etc. In some implementations, the frame control field 621 may indicate whether the PPDU 600 is a secure/protected PPDU 600 or an unsecure/unprotected PPDU 600 (such as MIC present or CRC present). For example, a first value in the type subfield may indicate the WUR Beacon frame while a second value in the type subfield may indicate the WUR control frame. In some implementations, the frame type indicated by the type subfield may help or may implicitly differentiate between constant length and variable length PPDUs 600. For example, WUR broadcast frames may be constant length while Beacon or control frames may be variable length. The length/subtype field (not shown) may be a 3 bit field that may provide information indicating one or both of different frame subtypes or payload or frame body sizes for a payload or frame body of the PPDU 600 and MPDU 602. In some implementations, as will be described in more detail below, the payload or frame body may be integrated with the MAC header portion 620. In some implementations, the length/subtype field may have a length of four bits. In some implementations, the length of the MAC header 620, or of the MPDU 602, or of the variable portion of the MPDU may be indicated by the length specified in the frame control field 621. When the length/subtype field is included, the length may provide lengths for variable length frames. Alternatively, or additionally, the subtype field may provide additional details of subtypes for constant length frames. The frame control field 621 may further include two bits for future use (one or both of these two bits may be used for security purposes, as described in further detail below). In some implementations, the frame control field 621 may be moved to the PHY preamble 610 and may be part of a SIG field of the PHY preamble or encoded in the PHY preamble itself. The possible breakdown above of the frame control field 621 also may apply to the frame control field 321 of FIG. 3.

The partial BSSID field 623 (may optionally be present with a length TBD) may provide identification of an identity (such as an ID) of a transmitting BSS. The transmitting BSS may correspond to the BSS from which the WUR communication is transmitted. For example, the partial BSSID field 623 may include a partial address or identifier for the AP 104 or STA 106 that transmitted the PPDU 600. In some implementations, the receive WUR STA may use the partial BSSID field (and the information contained therein) to determine whether or not the WUR STA is a potential intended recipient for the PPDU 600. For example, during association with the AP 104 or the wireless communication system 100, the WUR STA may be assigned or provided with a BSSID for the BSS to which the WUR STA belongs (such as the BSS in the BSA 102). Accordingly, the WUR STA may store the BSSID for its BSS in its memory (such as the memory 206 of FIG. 2). When the WUR STA compares the partial BSSID 623 to the stored BSSID, if the values match, then the WUR STA may determine that the received PPDU 600 does apply to the WUR STA and perform additional checks as described below. However, if the partial BSSID 623 does not match the WUR STA stored BSSID, then the WUR STA may determine that the received PPDU 600 does not apply to the WUR STA and may ignore the remainder of the PPDU 600. Accordingly, the partial BSSID field 623 may be used to reduce computations, processing, and reception of the PPDU 600 by WUR STAB that do not need to pay attention to the PPDU 600. In some implementations, the partial BSSID 623 may be a value that is known by both the AP 104 and the WUR STA, which may change in time according to a function (such as a random generator with a seed known at both devices) that is known at both the AP 104 and WUR STA.

In some implementations, the partial BSSID 623 field may only include one octet of the BSSID of the transmitting device. In some implementations, the single octet of the BSSID (such as the partial BSSID) is sufficient to provide adequate intra-PPDU power savings and discarding of PPDUs 600 sent by other BSSs (APs) as compared to the added costs (such as time, bandwidth, etc.) of transmitting and processing the full BSSID. Accordingly, the partial BSSID field 623 may provide for reduced accuracy of identifying whether the WUR STA belongs to the same or different BSS as the transmitting AP 104 or STA 106 while providing for reduced communication costs (such as time, bandwidth, etc.). Additionally, in some implementations, the partial BSSID field 623 may be used in some implementations of minimization of false alarms in the FCS, as discussed in further detail below. Additionally, or alternatively, the partial BSSID may be masked or hidden in another field of the MPDU 602, for example the FCS 630. Additionally, or alternatively, the paged IDs may be scrambled or masked with the partial BSSID, as will be discussed in further detail below.

The timestamp field 624 (optional with a length TBD) may contain a partial timing synchronization function (TSF). The partial TSF may allow the WUR STA to synchronize its clock to match the clock of the transmitting AP 104. The partial TSF also may allow the WUR STA to prevent and avoid replay attacks, as will be described in further detail below. The timestamp field 624 may have a length of 1 byte. Alternatively, or additionally, the timestamp field 624 may include a sequence number (such as the timestamp field 624 may be the timestamp/sequence number field 624). The sequence number pay provide an alternative for a counter of secure frames and provide other purposes, such as BSS parameter updates, etc. In some implementations, the timestamp field 624 may include change sequence information or control information. For example, control information may be carried in the timestamp field 624 in the timestamp information (such as scrambled or masked) or prior to or after the timestamp information. In some implementations, if control information is desired for each paged ID, then the paged IDs field 622 may be followed by a control field (not shown). Thus, each paged ID may have a dedicated or shared control field. The control field may have a variable length based on at least one of the control information and the number of paged IDs. In some implementations, the control field may provide for special signaling to one or more WUR STA. For example, the control information may include application layer commands. Alternatively, or additionally, the control information may include indications of which WUR STAs are to turn on their main radio or which radio to turn on in dual/tri-band radios or which antennas to activate in multi-antenna STAs. In some implementations, the control field application may be dependent on the type of the PPDU 600. In some implementations, the special commands may instruct which main radio to turn on (such as by identifying a radio number, technology, or band). In some implementations, the special commands may indicate which bandwidth to use or may specify one or more receive or transmit parameters.

In some implementations, the control information may be common to all of the identified WUR STAs in the paged IDs field 621. In some implementations, one or more of the identified WUR STAs in the paged IDs field 621 may have unique instructions from others of the identified WUR STAs in the paged IDs field 621. The association of WUR STAs to particular control instructions may be identified in the frame control field 621, such as the length subfield. For example, the length subfield may indicate that each identified WUR STA has a respective control instruction field. In some implementations, the length field may provide the length of both page ids and control Ids (unit of 2 bytes as an example because one paged id may be one byte and control another one) and the length may have a range between 2 to 14 bytes.

In some implementations, the two byte paged ID and control field may include a combination of AID identifier bits and control/misc. instructions bits. For example, the two byte paged ID and control field may include 12 AID identifier bits and 4 control/misc. instructions bits. In some implementations, the combination may be 8 AID identifier bits and 8 control/misc. instructions bits. In some implementations, the various combinations of the AID identifier bits and the control/misc. instructions bits are negotiated in advance between the AP 104 and the WUR STA. In some implementations, the combination of AID identifier bits and the control/misc. instructions bits may be vendor specific (such as different vendors may have different numbers of AIDs identifier bits and different numbers of control/misc. instructions bits, etc.).

In some implementations, the commands or instructions associated with the control/misc. instructions bits may be negotiated in advance between the AP 104 and the WUR STA. For example, these bits and the corresponding instructions may be negotiated during association of the WUR STA with the AP 104. For example, the control/misc. instructions bits may be stored in a table-type format with each bit corresponding to a particular action, command, or instruction.

The paged IDs field 622 (may include one or more paged IDs each of which may be 1 byte in length) may provide a list of intended receiving WUR STAs of the payload or frame body or of the WUR PPDU 600. In some implementations, the paged IDs field 624 may include identifiers, each of which may identify one WUR STA or assigned to a group of WUR STAs or identify all WUR STAs associated to the device sending the PPDU 600. The paged IDs field 622 may be used in conjunction with the partial BSSID field 623 of FIG. 6. For example, when a WUR STA determines that the partial BSSID field 622 (or BSSID stored or retrieved from elsewhere, for example, masked with FCS 630 or paged ID) matches the BSSID of the WUR STA, then the WUR STA may proceed to confirm that the ID of the WUR STA is included in the paged IDs field 622. If the ID of the WUR STA is not included in the paged IDs field 331, then the WUR STA can stop receiving the PPDU 600 and can ignore any received information. On the other hand, if the ID of the WUR STA is included in the paged IDs field 622, then the WUR STA proceeds to receive the remainder of the PPDU 600 and follows any instructions included in the PPDU 600. In some implementations, each paged ID in the paged IDs field 622 may be mixed, scrambled, coded, or masked with a known portion of an identifier of the BSS of the AP 104 (such as XORed with certain 8 bits of the BSSID of the AP 104 and the WUR STA) so that the paged ID values are not concentrated in a certain portion of the range of available IDs. For example, if all APs 104 start allocating IDs in increasing order, then the likelihood that multiple APs 104 assign low values (such as 1, 2, etc.) is high. If APs 104 apply this rule, then paged ID values can be uniformly spread across the 1-255 range. In certain implementations, the APs 104 may use a random generator for selecting the paged IDs that are assigned to associated STAs. The random generator and selected/assigned paged IDs may be known by all APs 104 that are within range so that paged IDs assigned by APs 104 in the same area do not coincide or overlap.

In some implementations, the paged IDs field 622 may have a length of one byte. With a length of one byte, the paged IDs field 622 may indicate or identify a single WUR STA to or with which the PPDU 600 applies or is associated. The paged IDs field 622 may have a size of up to 8 bytes, allowing the PPDU 600 to apply or be associated with up to 8 different WUR STAs. For example, when the length subfield in the frame control field 621 is 3 bits, then only 8 paged IDs can be included. Thus, length subfield of the frame control field 621 may indicate the number of WUR STAs identified by the paged IDs field 622 and, accordingly, may indicate a number of bytes of the length of the paged IDs field 622 (maximum of 8). In some implementations, when the length subfield is zero (0), the PPDU 600 may be intended to be a broadcast or multicast PPDU that applies to all WUR STAs or to all WUR STAs sharing the BSSID of the partial BSSID field 622. In such an implementation, the paged IDs field 622 may have a length of zero and may not include any WUR STA identifiers. In some implementations, when the length subfield is 0 for the broadcast PPDU, the pages IDs field 622 may have a length of one (1) byte without including any WUR STA identifiers (such as may have a value of zero, indicating that the PPDU is a broadcast PPDU). In some implementations, the paged IDs field 622 is included in multicast or broadcast PPDUs 600. In some implementations, only a single paged ID may be present in the paged IDs field 622 (length of 1 byte) for a unicast PPDU 600.

The paged IDs subfield 622 of 1 byte length may be used to identify one of up to 256 unique STA identifiers (or if value 0 is used for broadcast than up to 255 unique STA identifiers). The number of STAs that can be identified depends on the size of the paged ID. For example, if the paged ID is 11 bits in length, then the paged ID may be used to identify up to 1024 STA (assuming value of 0 is used for broadcast), and so on. However, if the AP 104 serves more than 256 STAs, then the AP 104 may be configured to orthogonally schedule STAs that share the same paged IDs. If the paged IDs are obtained from an association identifier (AID), such as 8 LSBs of the AID that provided the paged ID, then the AP 104 may make such scheduling using one or more of the remaining MSBs of the AID. For example, STAs having an association identifier of "1" and "257" may share the LSB of 0000 0001. Accordingly, if the paged IDs field 622 identifies the STA having the identifier 0000 0001, then both the STA "1" and the STA "257" will determine, based on the partial BSSID field 623 and the paged IDs field 622, that the PPDU 600 is intended for the STA. Accordingly, the STA "1" and the STA "257" may be considered "clones." During association of the STA "1" and the STA "257," the AP 104 may schedule clones to have orthogonal wake times or allocated in orthogonal groups. For example, the STA "1," during association, may be provided to have a scheduled wake times and wake time durations (SPs) such that they do not coincide with the scheduled wake times and wake time durations of STA 257 (such as STA 1 may be scheduled the first 10 ms of a 20 ms wake time duration and STA 257 may be scheduled the second 10 ms of the 20 ms wake time duration). Accordingly, the clone STAs (such as the WUR STAs having the same LSB identifiers or paged ID) will not wake up simultaneously and unintended WUR STAs will not be awakened just because they share an LSB identifier or paged ID with an intended WUR STA.

Alternatively, or additionally, a most significant bit (MSB) of the identifier for the paged IDs may be masked in one or more other fields of the PPDU 600 or the MPDU 602. For example, the paged IDs in the paged IDs field 622 may be associated with between one and four groups of MSBs. For example, for the STA "1" and the STA "257," the STAs will be associated with two groups of MSBs. The STA "1" will be associated with an MSB of "0" while the STA "257" will be associated with an MSB of "1." Accordingly, the MSB identifiers may be communicated to the WUR STA to allow the WUR STA to determine if the PPDU 600 is intended for it or for another WUR STA having the same LSB identifier in the paged ID field 622.

In some implementations, the AP 104 may desire to send instructions or page more than 8 WUR STAs. In such an implementation, the AP 104 may send a multicast or broadcast PPDU 600 (such as having the length of 0, as described herein). Alternatively, or additionally, the AP 104 may transmit back-to-back (such as consecutive) PPDUs 600. When multiple PPDUs 600 are transmitted back-to-back, the AP 104 may include STA identifiers in the paged IDs field 622 in only ascending order, which may allow STAs to know when they will not be paged in later PPDUs 600. For example, when a first PPDU 600 of two or more back-to-back PPDUs 300 includes paged IDs for WUR STA 1, 3, and 8, the WUR STA 5 may know that later PPDUs 600 of the two or more back-to-back PPDUs 600 will not page the STA 5 because the lowest WUR STA that can be paged by subsequent PPDUs 600 is 9 (such as the STA identifiers only ascend between PPDUs). Such an ascending order may allow WUR STAs to optimize their sleep patterns by determining when they will not be paged without having to wait for all back-to-back PPDUs 600 from being received and reviewed. In some implementations, one or more bits may be included in the MPDU 602 to indicate that a train of one or more other PPDUs 600 is following the current PPDU 600.

In some implementations, the no paged ID field 622 is included in broadcast PPDUs 600 as noted above. In such an implementation, each receive WUR STA will decode the PPDU 600, independent of the BSS of the WUR STA. Thus, in some implementations, the partial BSSID field 623 and the paged IDs field 622 may be eliminated from the MAC header 620 (further reducing the minimum MPDU 602 size to 3 bytes). In some implementations, one paged ID may be included in the paged ID field 622 for broadcast frames. Accordingly, the AP 104 may allocate a single WUR STA ID for inclusion in the paged IDs field 622. In some implementations, this WUR STA may drop other BSSIDs. Additionally, or alternatively, the AP 104 may scramble or mask a portion of the BSS identifier of the AP 104 with the paged IDs included in the paged ID field 622. For example, the AP 104 may mask its (or a portion thereof such as BSSID[40:47]) BSSID with the target paged IDs as stored in the paged IDs field 622. The receive WUR STAs can descramble the paged IDs in the paged IDs field 622 and determine if any of the obtained paged IDs match the WUR STA's identifier or if it is a broadcast value (such as paged ID value of 0). If the WUR STA determines that one of the descrambled paged IDs matches the WUR STA identifier, or that the broadcast value was included, then the WUR STA receives the remainder of the packet and performs additional actions. If the WUR STA determines that the descrambled paged ID does not match the WUR STA identifier and that the broadcast value is not included, then the WUR STA may discard the PPDU 600.

Figure 7:
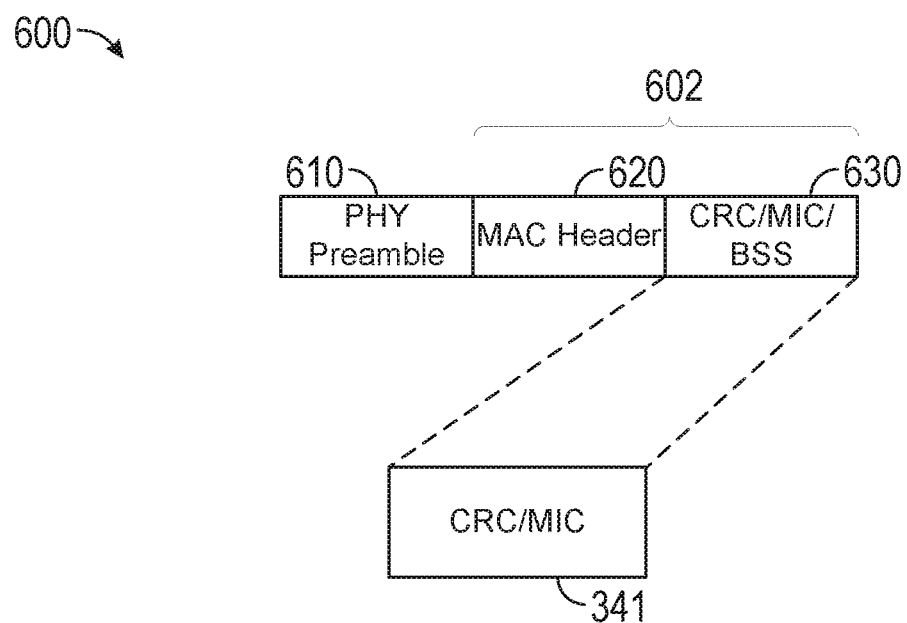
FIG. 7 illustrates further details of the example structure of the PPDU of FIG. 6 for communicating with the WUR device.

FIG. 7 illustrates further details of the example structure of the PPDU 600 of FIG. 6 for communicating with the WUR device 202 (FIG. 2). As depicted in FIG. 7, the FCS 630 (length TBD) may include a cyclic redundancy check (CRC) or a message integrity check (MIC). The CRC may be used to detect errors in unsecured PPDUs 600. The MIC may be used to detect errors and replay attacks in secure PPDUs 600. In some implementations, there may not be any need for an explicit CRC for the PPDU 600.

In some implementations, the AP 104 may hide, scramble, or mask its partial BSSID in the FCS 630. Various methods may be used for such scrambling or hiding. For example, the AP 104 may XOR its partial BSSID (such as BSSID[23:38]) with the FCS 630. Accordingly, the WUR STA will only successfully decode received PPDUs 600 generated by its AP 104 because only those WUR STAB will have the proper BSSID values to successfully decode the FCS 630. PPDUs generated by other APs 104 will decode as being corrupted because the improper BSSID decoder value will result in an incorrect FCS 630. By using such a scrambling or coding method, the partial BSSID may not need to be included as a separate field, saving communication time, power, and bandwidth. In some implementations, the FCS field 630 may have a length of 2 bytes, which may provide for better security and protection, fewer false alarms, and greater prevention of replay attacks. In some implementations, the AP 104 may compute the CRC and the MIC assuming that the BSSID of the AP 104 is present in the PPDU 600 (such as immediately after the FCS or prior to the FCS) and omit the BSSID from transmission (such as compute but do not transmit). The WUR STA, when it receives the PPDU 600, may check the FCS or MIC under the assumption that the BSSID was present (such as the MAC address of the AP 104 transmitting the PPDU 600).

Accordingly, in some implementations, computing the CRC may be based at least in part on an assumption that at least a portion of the BSSID is present in the WUR frame. For example, a transmitter may append one or more bits of the BSSID in the WUR frame but without transmitting the one or more bits of the BSSID (such as a 16 bit address 2 field may be present after an ID field but the address 2 field may not be transmitted).

Alternatively, the CRC may be computed as described herein and then may be scrambled or embedded with some information of the BSSID with which the transmitter device (such as the AP 104) is associated. In some implementations, the XORing may be expanded to other fields of the WUR frame. For example, if the WUR frame is 6 bytes long, then WUR frame may be scrambled with 6 bytes of BSSID. The scrambling of the CRC may occur before the CRC is included in the FCS 630. The CRC may be scrambled with 16 bits of the BSSID. As described herein, the scrambling may include XORing the CRC. A receiver device (such as the STA 106) may descramble the CRC based on known information of the receiver BSSID before checking or comparing the descrambled CRC to confirm that it passes. In some implementations, the MIC may be computed and scrambled or embedded instead of the CRC.

In some implementations, the CRC/MIC/BSS fields of the FCS 630 may be used to ensure that WUR STAs are not woken up by PPDUs from an attacker or non-friendly AP 104. For example, a security protocol with low overhead may be used to avoid CCMP-like signaling, where the MIC has 8 or 16 bytes and the CCMP header has 8 bytes. Accordingly, the PPDUs 300 or MPDUs 302 may be unsecure when the FCS 340 contains the CRC and secure when the FCS 340 contains the MIC. In some implementations, the frame control field 321 may be used to signal whether CRC or MIC is used for a particular PPDU 300 or MPDU 302. In some implementations, the MIC is a truncated output of a selected cipher suite (such as baseline) and the timestamp field 624 TSF timer may act as a packet number. Accordingly, the PPDUs 600 may be unsecure PPDUs when the FCS 630 contains the CRC with a scrambled/coded/masked/camouflaged/etc. BSSID of the AP 104 and may be secure PPDUs when the FCS 630 contains the MIC with scrambled/coded/masked/camouflaged/etc. BSSID of the AP 104. In some implementations, the frame control field 621 may signal differences between the secure and unsecure PPDUs 600.

In some implementations, the MIC computation may be based on the entire MPDU 602. For example, the MPDU 602 may be intended for a single WUR STA or a plurality of WUR STAs. In some implementations, the MIC is generated by the AP 104 based on a group key known by both the AP 104 and the one or more WUR STAs. For example, the group key may be a PCR group key, etc., IGTK. The group key may be known by all STAs associated with the AP 104 that are intended receivers for the PPDU 600. In some implementations, the timestamp field 624 may provide part of a monotonically increasing counter. For example, the timestamp field 624 may contain the MSB of the 2 LSBs of the TSF timer, which may provide 256 us steps in time and a wraparound of the timestamp every 65536 ms. In some implementations, a full TSF timer at the WUR STA is updated using the partial TSF included in the timestamp field 624. In some implementations, the absolute TSF timer may be used as an input parameter for the MIC computation, which may be further used to protect the WUR STA from replay attacks.

In some implementations, the MPDU 602 may have a minimum length and a maximum length. The length may be signaled or determined based on a frame type of the PPDU 600 (such as in the frame control field 621, as described herein). For example, the MPDU 602 may have a minimum length of five (5) bytes. The MPDU may include one or more of the frame control field 621 of 1 byte, the paged IDs (RA) field 622 (TBD), the partial BSSID (TA) field 623 (TBD), the timestamp field 624 (TBD), and the CRC/MIC/BSS field 631 (TBD), assuming that the paged IDs (RA) field 622 has a length of zero bytes (such as for a broadcast or multicast PPDU 600) and each of the remaining TBD fields have a minimum length of 1 byte. In some implementations, as described above, the MPDU 602 may have a minimum length of six (6) bytes when the frame control fields 621 indicates no length (such as no paged IDs) but where the paged IDs field 622 is included with a length of 1 byte but a zero value. In some implementations, constant length PPDUs 600 may have minimum MPDU 602 sizes of 5 or 6 bytes. For example, the minimum sized MPDUs 602 may utilize ~0.77 ms of time to transmit at 62.5 Kbps.

The MPDU 602 may have a maximum length of twelve (12) bytes. For example, the MPDU 602 may include the minimum 5 bytes described above and then also include 7 bytes for 16 identifiers in the paged ID field 622. Thus, the maximum length for the MPDU 602 may be the 5 bytes of the non-paged IDs fields plus the maximum of 8 bytes for the paged IDs field 622. In some implementations, variable length PPDUs 600 may be signaled or determined based on the frame type and length in the frame control field 621. The maximum MPDU 602 length of 12 bytes may use ~1.66 ms of transmission time at 62.5 Kbps. In some implementations, the MPDU 602 may have a length anywhere between 5 bytes and 12 bytes.

Figure 8:
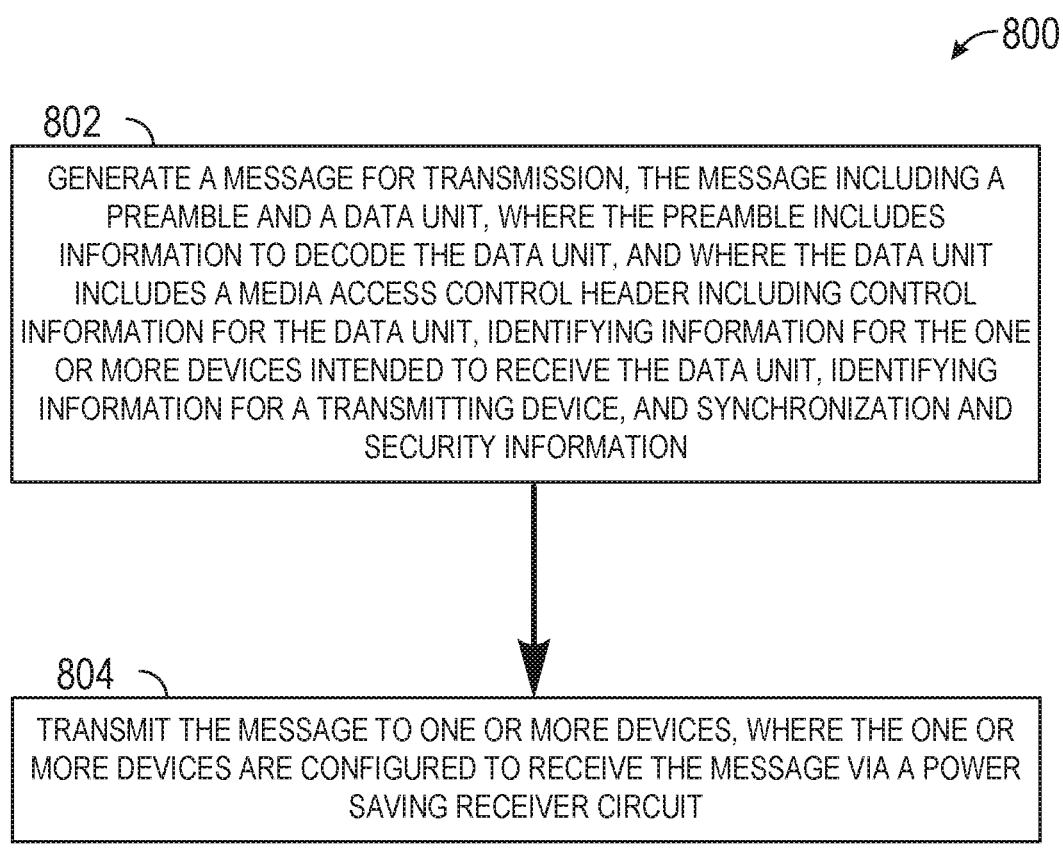
FIG. 8 illustrates a flowchart of an example method of wireless communication.

FIG. 8 is a flow chart of an example method 800 of wireless communication. Although the method 800 is described herein with reference to communications among an AP 104 and STAs 106 as discussed above with respect to FIG. 1, a person having ordinary skill in the art will readily appreciate that the method 800 may be implemented by other suitable devices and systems. For example, the method 800 may be performed by a STA 106 or a plurality of APs 104. Although the method 800 is described herein with reference to a particular order, in various implementations, blocks herein may be performed in a different order, or omitted, and additional blocks may be added.

At block 802, the method may include generating a message for transmission, the message including a preamble and a data unit. The preamble may include information to decode the data unit. The data unit may include control information for the data unit, identifying information for the one or more devices intended to receive the data unit, identifying information for a transmitting device, and synchronization and security information. At block 804, the method may further include transmitting the message to one or more devices from the transmitting device. The one or more devices may be configured to receive the message via a power saving receiver circuit.

In some implementations, an apparatus for wireless communication may perform some of the implementations described herein. In some implementations, the apparatus may include means for generating a message transmission, the message including a preamble and a data unit. The preamble may include information to decode the data unit. The data unit may include control information for the data unit, identifying information for the one or more devices intended to receive the data unit, identifying information for a transmitting device, and synchronization and security information. The apparatus may further include means for transmitting the message to the one or more devices from the transmitting device. The one or more devices may be configured to receive the message via a power saving receiver circuit.

Figure 9:
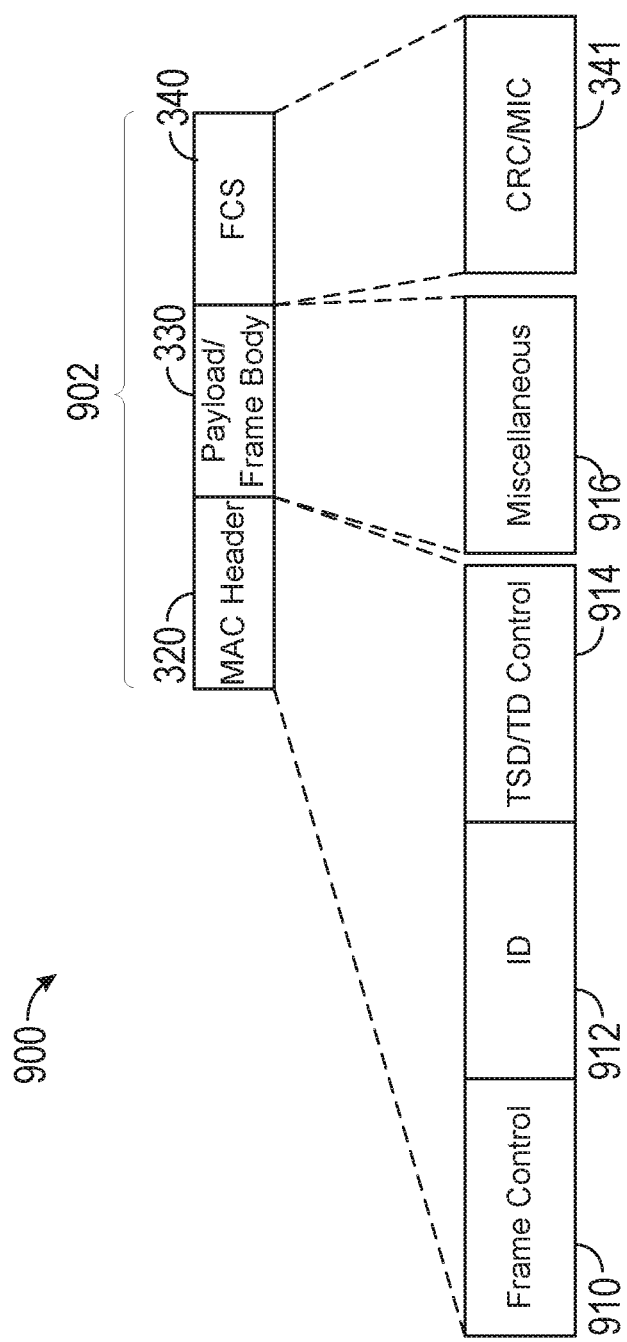
FIG. 9 illustrates further details of the example structure of the PPDU of FIG. 3 for communicating with the WUR device.

FIG. 9 illustrates further details of the example structure of the PPDU 300 of FIG. 3 for communicating with the WUR device 202 (FIG. 2). FIG. 9 illustrates only the three portions of the one or more MPDU 902 contained in the PPDU 300. More than one MPDU may be contained in a PPDU that is sent in MU mode (such as using OFDMA multiplexing techniques). The MPDU 902 may include one or more of a MAC header 320, payload or frame body portion 330, and FCS 340. The MAC header 320 may include one or more common fields that are present in all WUR frames or PPDUs. For example, the MAC header 320 may include one or more of a frame control field 910, an identifier (ID) field 912 (which also may be referred to as an address field), and a TSD (type subtype dependent)/TD (type dependent) control 914. Either one of the TSD or TD may be present in the WUR frame. In some implementations, TSD and TD may be used interchangeably. The payload or frame body portion 330 may contain miscellaneous information and may have a length of zero ("0") or more bits. In some implementations, the length may be a multiple of one octet, or two octets, etc., and the length may be indicated in the Frame Control field. The FCS 340 may include cyclic redundancy check ("CRC") or message integrity check ("MIC") depending on the type of PPDU 300 received. For example, the CRC may be present if the frame is not secure, and the MIC may be present if the frame is secured. The FCS field 340 may be a 16 bit field. The FCS 340 may additionally be computed accounting for the BSSID address if the frame is sent to one or more STAs that are associated with the BSS. The FCS 340 may not be computed accounting for the BSSID address if the frame is sent to one or more STAs that are not associated with the BSS.

As depicted in FIG. 9, the MAC header 320 may include one or more of the three separate fields: the frame control field 910, the ID field 912, and the TSD/TD control field 914. The frame control field 910 may be an 8 bit field, the ID field 912 may be a 12 bit field, and the TSD/TD control frame 914 may be a 12 bit field. In some implementations, some part of the contents of the Frame Control field may be carried in the PHY preamble of the WUR PPDU. Additionally, the payload or frame body portion 330 may have a variable length and the FCS may have a length of 8, 16, 24, and 32 bits. For example, the maximum lengths for the payload or frame body portion 330 may be 8, 16, 32 or 64 bytes. In some implementations, the length of the payload or frame body portion 330 is indicated in the frame control field 910, and is in units of 1 octet, 2 octet, etc.

The 1 byte frame control field 910 may provide information that identifies details of at least one of the MPDU 902 type and length, and additional information that may be used to decode the MPDU. In some implementations, the frame control field 910 may include a one bit protocol version field (not shown), where zero (0) is currently used and one (1) is saved for future development. In some implementations, the frame control field 910 may include a type subfield (not shown) and a length/subtype field (not shown). The type subfield may be configured to identify a frame type for the MPDU 902. In some implementations, the type subfield may indicate that the MPDU 902 is a WUR Beacon frame, a WUR control frame, a WUR sync frame, a WUR paging frame, etc. In some implementations, the type subfield may be used to differentiate between constant or variable length frames. For example, a first value in the type subfield may indicate the WUR Beacon frame with a constant length while a second value in the type subfield may indicate the WUR control frame with a varied length. The length/subtype field may provide information indicating one or both of different frame subtypes or different payload or frame body sizes for the payload or frame body portion 330 portion of the MPDU 902. Alternatively, or additionally, the length/subtype field may provide a parity bit which may indicate validity or lack of corruption in the frame. Alternatively, or additionally, a bit (such as the first bit or the last bit of the frame control field 910) may be a parity bit that indicates validity or corruption of one or more of the subfields of the MPDU 902. In some implementations, the parity bit may be computed to cover only the frame control field 910, or the frame control field 910 and the ID field 912. Alternatively, or additionally, the length/subtype field may indicate a frame subtype for constant length frames or a length for variable length frames. In some implementations, the parity bit may be any bit in the frame control field 910. For example, the parity bit may be either bit 1 of the frame control field 910 or the last bit of the frame control field 910. Alternatively, or additionally, the parity bit could also be one of the bits of the ID field 912 (such as the last bit).

The ID field 912 may optionally be present and may be 8 or 12 bits in length and may provide identification of an identity (such as an ID) of a transmitting device. The transmitting device may be identified by the transmitting BSS, which may correspond to the BSS from which the WUR communication is transmitted. For example, the ID field 912 may contain a partial BSSID field 322 or it may include a partial address or identifier for the AP 104 or STA 106 that transmitted the PPDU 300. Alternatively, the ID field 912 may include a portion of the BSSID or a portion of the service set identifier (SSID). In some implementations, the receive WUR STA may use the ID field 912 (and the information contained therein) to determine whether or not the WUR STA is a potential intended recipient for the PPDU 300. For example, during association with the AP 104 or the wireless communication system 100, the WUR STA may be assigned or provided with a BSSID for the BSS to which the WUR STA belongs (such as the BSS in the BSA 102). Accordingly, the WUR STA may store the BSSID for its BSS in its memory (such as the memory 206 of FIG. 2). When the WUR STA compares the partial BSSID 322 to at least a portion of the stored BSSID (or the portion to be compared may be stored rather than the full BSSID), if the values match, then the WUR STA may determine that the received PPDU 300 does apply to the WUR STA and perform additional checks as described below. However, if the partial BSSID 322 does not match the WUR STA stored BSSID or SSID, then the WUR STA may determine that the received PPDU 300 does not apply to the WUR STA and may ignore the remainder of the PPDU 300. Accordingly, the partial BSSID field 322 may be used to reduce computations, processing, and reception of the PPDU 300 by WUR STAB that do not need to pay attention to the PPDU 300. In some implementations, the partial BSSID may be a value that is known by both the AP and STA which may change in time according to a function (such as a random generator with a seed known at both devices, or in line with a time reference common at the AP and STA) that is known at both the AP and STA. In some implementations, the ID field 912 may contain an identifier for the WUR frame, which may be selected from Table 1 below. The identifier included in the ID field 912 may be dependent on the type of WUR frame (identified below in relation to Table 2).

TABLE 1

Identifiers of WUR frames

| ID field | Identifier description |
|---|---|
| Transmit ID | Identifier of the transmitting AP (may be provided by the AP to the WUR STAs) |
| Group ID | Identifier of a group of receiving WUR STAs (may be provided by the AP to the group of WUR STAs) |
| WUR ID | Identifier of an individual receiving WUR STA (may be provided by the AP to the WUR STA) |
| OUI1 | The 12 MSBs of the organizational unique identifier (OUI) |

In some implementations, the ID field 912 of a WUR frame (such as a wake-up frame) contains the WUR ID when the WUR frame is individually addressed, the Group ID when the WUR frame is group addressed, and the Transmit ID when the WUR frame is broadcast. In the descriptions below, other implementations for the identifiers contained in the ID field and in other fields of the WUR frame are provided.

In some implementations, the partial BSSID 322 field may only include one octet of the BSSID of the transmitting device or 12 bits of the BSSID (or SSID). In some implementations, the single octet or 12 bits of the BSSID (such as the partial BSSID) is sufficient to provide adequate intra-PPDU power savings and discarding of PPDUs sent by other BSSs (APs) as compared to the added costs (such as time, bandwidth, etc.) of transmitting and processing the full BSSID. Accordingly, the partial BSSID field 322 may provide for reduced accuracy of identifying whether the WUR STA belongs to the same or different BSS as the transmitting AP 104 or STA 106 while providing for reduced communication costs (such as time, bandwidth, etc.). Additionally, in some implementations, the partial BSSID field 322 may be used in some implementations of minimization of false alarms in the FCS, as discussed in further detail below. In some implementations, the frame control field 910 can be moved to the PHY preamble if there is a SIG field in the PHY preamble.

The TSD/TD control field 914 contains control information that depends on the type or subtype of the MPDU 902, as discussed in more detail below. For example, the TSD/TD control field 914 may contain a partial TSF if the MPDU 902 is a beacon, a packet number if the MPDU 902 is paging one or more STAs to wake up and the frame is protected, other control information may be carried in this case such as partial TSF etc. In another example, the TSD/TD control field 914 may contain additional portions of the transmitter identifier. This may be useful for frames sent prior to association (such as for locationing, discovery, and ranging purposes) as these frames may require a lower false alarm probability. In some implementations, the ID field and the TSD/TD control field 914 may be such that a portion of the transmitter identifier is stored in the ID field and another portion of the transmitter identifier is stored in the TSD/TD control field 914. Alternatively, the TSD/TD control field 914 may contain a portion of the receiver identifier when the ID field contains a portion of the transmitter identifier, or vice versa. While we refer to a portion of the identifier in some implementations, these values may be identifiers that are assigned, or negotiated between the peer STAs using the main radio.

The payload or frame body portion 330 may be of variable length, and its content may be dependent of the MPDU type/subtype or other settings of fields that precede it in the MPDU 902. The payload or frame body portion 330 may contain information specific to particular individual WUR frame types. Additionally, the payload or frame body portion 330 may not be present in constant length WUR frames and may be present in variable length WUR frames. In some implementations, the length of the payload or frame body portion 330 may be equal to $X*(L+1)$, where L is the value of the length subfield in the frame control field 910 and X is the unit in octets (such as if the unit is 1 octet and the length field is 3 bits, or if the unit is 2 octets and the length field is 2 bits), 16 octets (similar considerations playing with the possible X, L values), 24 octets, or 32 octets. Examples of the possible miscellaneous fields are provided below in relation to FIG. 10.

Figure 10:
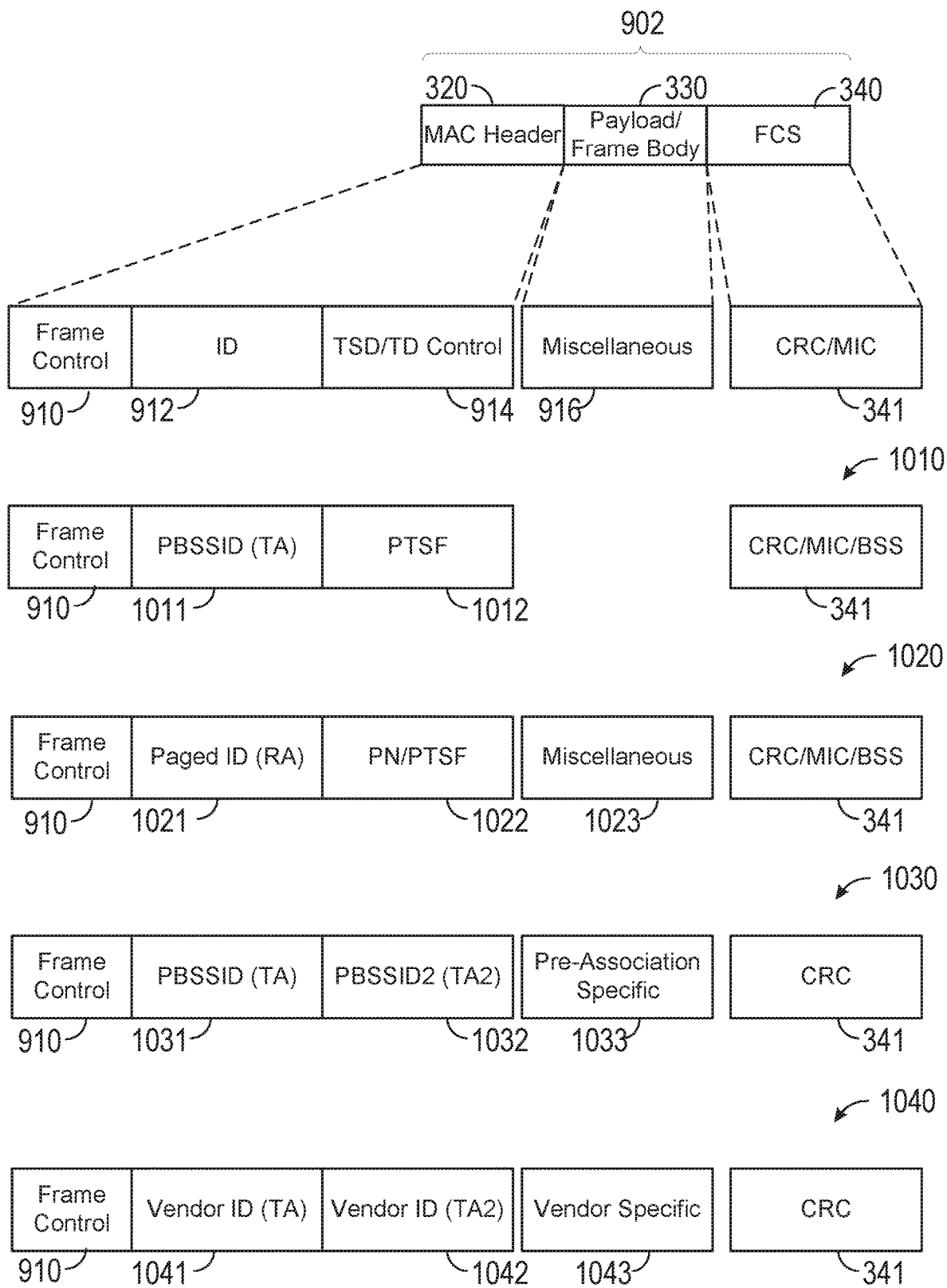
FIG. 10 illustrates further details of the example structure of the MPDU of FIG. 9.

FIG. 10 illustrates further details of the example structure of the MPDU 902 of FIG. 9. FIG. 10 illustrates four specific MPDU formats of the general MPDU format 902: a beacon format 1010, a paging format 1020, a pre-association format 1030, and an example vendor specific format 1040. As shown, each of these formats may be associated with a particular "type" value (or subtype value) which may correspond to a value to be used in the type subfield of the frame control field 910 described herein. Accordingly, the beacon format 1010 may be identified by the type field value being "0", the paging format 1010 may be identified by the type field value being "1", the pre-association format 1030 may be identified by the type field value being "2", and the vendor specific format 1040 may be identified by the type field value being "3".

As shown, the beacon format 1010 includes the 8 bit frame control field 910 as described above in relation to FIG. 9. The 12 bit ID field 912 referenced in relation to FIG. 9 is a partial BSSID (PBSSID) 1011 for the transmitting device, as described herein. For the beacon format 1010, the 12 bit TSD/TD control field 914 is a partial timestamp function (PTSF) field, 1011, and contains 12 bits of the timing synchronization function of the AP (such as the 12 LSBs of the Timestamp field that the AP would include in a transmitted beacon, or a certain window of size 12 bits of the Timestamp field). The PTSF field helps the receiver to synchronize its internal clock to that of the AP (such as a peer STA) with which the receiver is interacting. For the beacon format 1010, no payload or frame body portion 330 may be included, and the FCS 340 is the CRC/MIC/BSS field described herein. Thus, the beacon format 1010 may have a length of 6 bytes.

In some implementations, the beacon format 1010 may be constant or variable length. The constant length may be most used and may be required for use by all WUR devices. The enhanced or extended length beacon formats may be optional. In some implementations, a beacon format 1010 may have a subtype identifier (such as in the length/subtype field) of 0, indicating a constant length. If the length bits are not used to indicate the length of the payload or frame body portion 330, then this field (such as the remaining bits of the length/subtype field) may not be used and can be repurposed. For example, the bits may be used as extended control bits, such as a change sequence number that can indicate to the receiver STAs that a BSS system update has occurred if the change sequence number has increased.

As shown, the paging format 1020 includes the 8 bit frame control field 910 as described above in relation to FIG. 9. The 12 bit ID field 912 referenced in relation to FIG. 9 is a paged ID field 1021 for the receiving device, as described herein, and may contain the 11 LSBs of the association identifier of the receiving device. For the paging format 1020, the 12 bit TSD/TD control field 914 may be any of the following: a packet number field which is an increasing number that identifies the packet and may be used to identify replay attacks for protected frames, or may be used to identify the packet for which an acknowledgment is needed; a PTSF field which contains a portion of the timing synchronization function, which is useful for synchronizing the internal clock of the receiver to that of the transmitter, and additionally can be used as a counter to detect replay attacks over secure frames. For the paging format 1020, a frame body field 1023 of variable length may be included, and presence of the frame body field 1023 may be indicated by a nonzero length field in the frame control field 910, and the FCS 340 is the CRC/MIC/BSS field described herein. Thus, the paging format 1020 may have a minimum length of 6 bytes and a maximum length of 13 bytes, depending on the presence and length of the frame body field 1023.

The paging format 1020 may be basic or advanced. When the paging format 1020 is advanced, it may have a variable length based on the presence and length of the frame body field 1023 itself. Accordingly, the length/subtype field of the frame control field 910 may be used to indicate a length of the frame body field 1023 in units of 1 byte, in units of 2 bytes, 3 bytes, 4 bytes, and so on (unit known at both transmitter and receiver, and can be a default value). For example, when the length/subtype field indicates "2", the frame body field 1023 may have a length of 2 bytes. In some implementations, the 2 byte frame body field 1023 may indicate two addresses in reference to the paged ID in the paged ID field 1021. For example, the frame body field 1023 may include a range of addresses in relation to the paged ID in the paged ID field 1021. For example, when the frame body field 1023 is 2 bytes then it may contain a STA list of an additional 2 paged ID fields, identifying a second and a third STA, where the first STA is identified by the ID field itself of the WUR Paging frame. In this example the first STA is identified by the AID contained in the ID field, the second STA is identified by the AID (identifier) that is obtained from the 3 MSBs of the ID field and the first 8 bits of the STA list, while the third STA is identified by the AID (identifier) that is obtained from the 3 MSBs of the ID field and the second 8 bits of the STA list. As shown, the pre-association format 1030 includes the 8 bit frame control field 910 as described above in relation to FIG. 9. The 12 bit ID field 912 referenced in relation to FIG. 9 is a partial BSSID field 1031 or a partial identifier for the transmitting device (such as the PBSSID (TA)). For the pre-association format 1030, the 12 bit TSD/TD control field 914 is a second partial BSSID field 1032 (such as the PBSSID2 (TA2)), as described herein. The presence of two identifiers in the frame reduces significantly the false alarm probability. For the pre-association format 1030, the payload or frame body portion 330 may be specific to pre-association frames (such as a pre-association specific field 1033) and may be of variable length. The FCS 340 is the CRC field described herein. Thus, the pre-association format 1030 may have a minimum length of 6 bytes and a maximum length of 13 bytes, depending on the length of the pre-association specific field 1033. In some implementations, the vendor specific field 1043 may include a receiver address (such as an address of the receiving device for the vendor specific format 1040 frame).

In some implementations, the pre-association format 1030 may not be encrypted because the communicating devices may not be aware of encryption methods used by the other device until they are associated. Furthermore, the pre-association format 1030 may be transmitted by a transmitting device for locationing by the receiving device, to convey timing information, or to convey discovery information. In some situations, the CRC of the FCS 340 may be replaced with another PBSSID field (such as the PBSSID3 (TA3)) to further reduce the false alarm probability (from 24 bits now it becomes 32 bits identifier of that transmitter). In some implementations, the pre-association specific field 1033 may have a length indicated by the length/subtype field of the frame control field 910. For example, when the length field indicates a length of 2, then the pre-association specific field 1033 may have a length of 2 bytes and may be used to provide for fine timing synchronization, locationing, etc. In some implementations, the PBSSID field 1031 and the PBSSID2 field 1032 may include a hash of an SSID of the transmitting device (and the receiving device). For example, the 6-byte MAC address of an associated AP may be hashed down to 3 bytes and included in the PBSSID and PBSSID2 fields 1031 and 1032, respectively.

As shown, the vendor specific format 1040 includes the 8 bit frame control field 910 as described above in relation to FIG. 9. The 12 bit ID field 912 referenced in relation to FIG. 9 is a vendor ID 1041 for the transmitting device, which may identify a particular vendor, etc. For the vendor specific format 1040, the 12 bit TSD/TD control field 914 is a second vendor ID field 1024, which may identify a second transmitting device. In some implementations, the vendor specific format contains two partial identifiers, one in the ID field (such as the vendor ID field 1041) and one in the TSD/TD control field 914 (such as the second vendor ID field 1024). The vendor ID field 1041 may contain the 12 least significant bits (LSBs) of the organizational unique identifier (OUI), and the second vendor ID field 1042 contains another 12 bits of the OUI. The vendor ID fields 1041 and 1042 may identify the vendor of the device generating the frame. For the vendor specific format 1040, the payload or frame body portion 330 may include a vendor specific field 1043 of miscellaneous length, and the FCS 340 is the CRC field described herein. Thus, the vendor specific format 1040 may have a minimum length of 6 bytes and a maximum length of 13 bytes, depending on the length of the vendor specific field 1043. In some implementations, the vendor specific field 1043 may include a receiver address (such as an address of the receiving device) for the vendor specific format 1040 frame.

Figure 11:
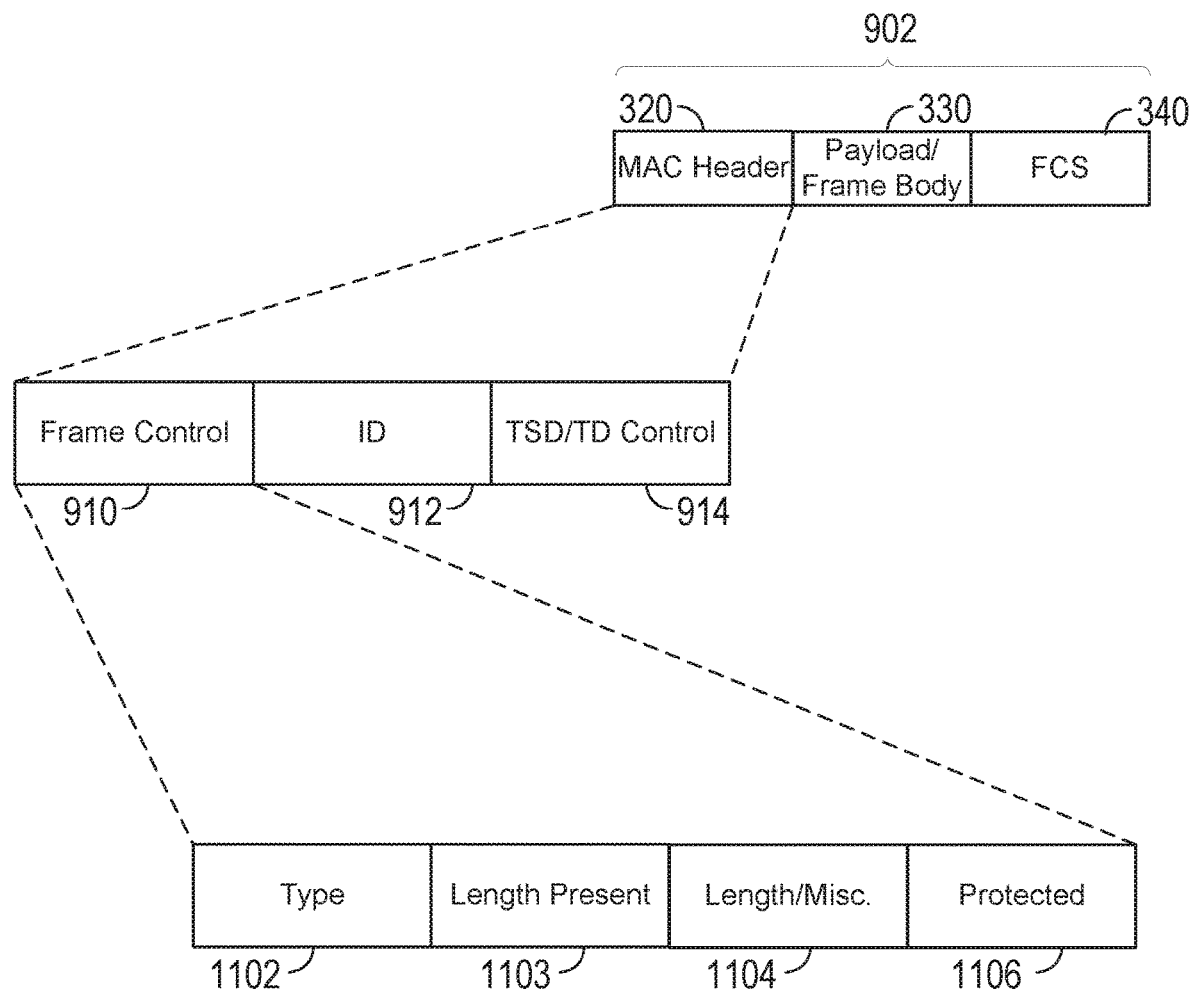
FIG. 11 illustrates further details of the example structure of the MPDU of FIG. 9.

FIG. 11 illustrates further details of the example structure of the MPDU 902 of FIG. 9, including details of the frame control field 910 of the MPDU 902. As shown, the frame control field 910 may include a type (or subtype) field 1102, a length present field 1103, a length or miscellaneous field 1104, and a protected field 1106. In some implementations, the type field 1102 may be 3 bits in length and the length/miscellaneous field 1104 may be 3 bits in length. The length present field 1103 may be 1 bit in length, and the protected field 1106 may be 1 bit in length. The type field 1102 may indicate a type of the MPDU 902. Example types for the MPDU 902 are provided below in Table 2:

TABLE 2

| WUR frame types | |
|---|---|
| Type | Type description |
| 0 | WUR Beacon |
| 1 | WUR Wake-Up |
| 2 | WUR Vendor Specific |
| 3 | WUR Discovery |
| 4-7 (if 3 bits) or 4-15 (if 4 bits) | Reserved |

For example, when the type field 1102 includes a value of "0", the MPDU 902 may be a WUR beacon frame. When the type field 1102 includes a value of "1", the MPDU 902 may be a WUR wake-up frame. When the type field 1102 includes a value of "2", the MPDU 902 may be a WUR vendor specific frame. When the type field 1102 includes a value of "3", the MPDU 902 may be a WUR discovery frame. When the type field 1102 includes a value of "4" or greater, the MPDU 902 may be another specific type of frame(s).

The length/miscellaneous field 1104 may include or act as a length field for the MPDU 902 when the length is variable and as a miscellaneous field for the MPDU 902 when the length is constant. In some implementations, whether or not the MPDU 902 is variable length or constant length may be indicated by a bit (such as a variable length or constant length bit). When the bit is set to "1", the MPDU 902 may be of variable length. When the bit is set to "0", the MPDU 902 may be of constant length. The bit may be indicated in various locations. As an example, this bit can be the most significant bit or the least significant bit of either the type field or the length/miscellaneous field. In some implementations, in addition to (or instead of) indicating whether the MPDU 902 is a variable or constant length, the bit may indicate whether the MPDU includes a length value. For example, the bit may be the length present field 1103 shown in FIG. 11, which may indicate whether the length/miscellaneous field 1104 includes a length for the MPDU 902. In some implementations, when the length present field 1103 is set to "1", the length/miscellaneous field 1104 may include the length of the MPDU 902, or may include a length subfield that indicates the length of the MPDU 902. When the length present field 1103 is set to "0", the length/miscellaneous field 1104 may be a miscellaneous field that is a reserved field, or may be a miscellaneous field that includes a reserved subfield. It is noted that the bit lengths described herein are examples and the bit lengths may have other values. For example, the type field 1102 may be 2 bits in length and the length/miscellaneous field 1104 may be 4 bits in length.

When the length/miscellaneous field 1104 is operating as the length field for a variable length MPDU 902, the length field 1104 may contain the length of the frame body field 330. When the length/miscellaneous field 1104 is operating as the miscellaneous field, the miscellaneous field 1104 may contain bits that are expected to be used to indicate or convey various other information, for example, as discussed above.

In some implementations, the protected field 1106 (which also may be referred as a protected subfield) may indicate whether the information carried in the WUR frame is protected. For example, the information carried in the WUR frame is protected when it has been processed by an MIC algorithm. The protected field 1106 may be set to "1" if the WUR frame is protected utilizing an MIC. For example, the protected field 1106 may be set to "1" when the FCS 340 includes an MIC (instead of a CRC). The protected field 1106 may be set to "0" when the information carried in the WUR frame is not protected or the information has not been processed by an MIC algorithm. For example, the protected field 1106 may be set to "0" when the FCS 340 includes a CRC (instead of an MIC).

As described herein, each WUR frame including the MPDU 902 may consist of the following components: a MAC header 320 (which includes the frame control 910, the ID field 912, and the TSD/TD control field 914, a frame body portion 330 (which may be variable length and, when variable length, contains information specific to the frame type), and an FCS 340 (which contains for example an 8-, 16-, or other bit CRC). In some implementations, the FCS may contain a different CRC. For example, the FCS 340 may include a CRC-16 FCS, which may include a degree 16 polynomial and corresponding computation(s), or a CRC-8 FCS, which may include a degree 8 polynomial and corresponding computation(s). In some implementations, another CRC polynomial or computation may be used or provided.

Figure 12:
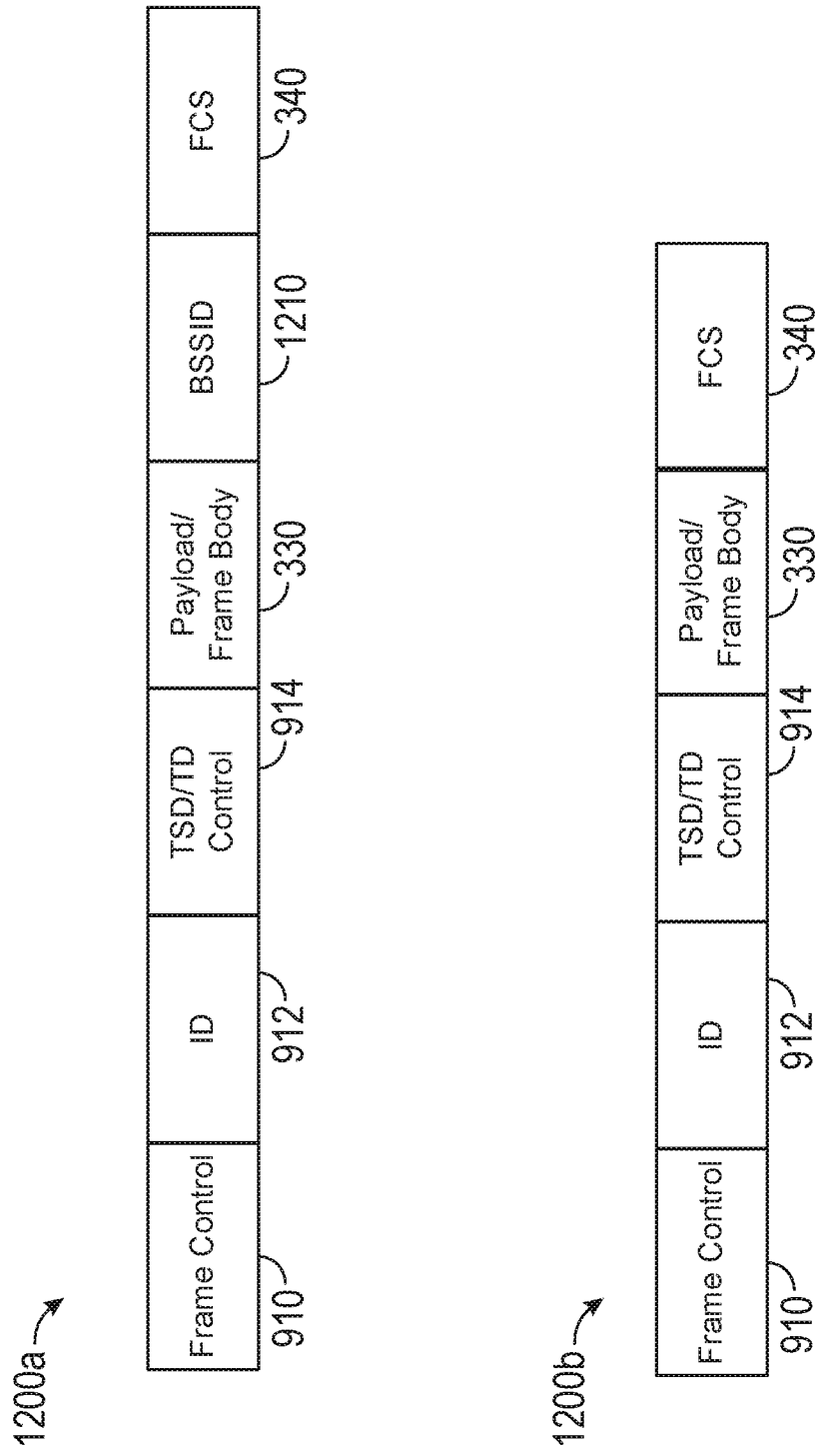
FIG. 12 illustrates details of an example WUR frame indicating an embedded BSSID field and of an example WUR frame not indicating the embedded BSSID field.

FIG. 12 illustrates details of an example WUR frame 1200a indicating an embedded BSSID field 1210 and of an example WUR frame 1200b not indicating the embedded BSSID field 1210. The WUR frame 1200a includes the frame control field 910, the ID field 912, the TSD/TD control field 914, the payload or frame body portion 330, an embedded BSSID field 1210, and the FCS field 340. The WUR frame 1200b includes the frame control field 910, the ID field 912, the TSD/TD control field 914, the payload or frame body portion 330, and the FCS field 340 without the embedded BSSID field 1210 explicitly included in the WUR frame 1200b.

In some implementations, the FCS field 340 may include a 16-bit CRC and the FCS may be calculated over the frame control field 910, the ID field 912, the TSD/TD control field 914, the payload or frame body portion 330, and the embedded BSSID field 1210 shown in WUR frame 1200a. In some implementations, the frame control field 910, the ID field 912, the TSD/TD control field 914, the payload or frame body portion 330, and the embedded BSSID field 1210 may be referred to as calculation fields. In some implementations, as discussed herein, the payload or frame body portion 330 may be optional (for example, may only be included in the WUR frame 1200a when the WUR frame 1200a is variable length). Otherwise, the payload or frame body portion 330 may not be included in the WUR frame 1200a. Similarly, the embedded BSSID field 1210 may only be included in the WUR frame 1200a for WUR frames that are not WUR discovery frames (for example, may only be present in post-association WUR frames). For WUR discovery frames, the embedded BSSID field 1210 may not be included in the WUR frame 1200a. In some implementations, the embedded BSSID field 1210 may be the last field, sequentially, in the calculation fields.

In some implementations, when the embedded BSSID field 1210 is not included in the WUR frame 1200b, the embedded BSSID may be obtained from a recent WUR Mode element or a recent WUR Operation element transmitted by the AP 104 to the STA 106. In some implementations, the embedded BSSID field 1210 may be obtained from a hash of a BSSID field contained in the WUR Mode element or the WUR Operation element. The AP 104 may include the WUR Operation element in either individually addressed management frames sent to the STA 106 (if the AP 104 wants these frames to be decodable only by the STA 106, such as by using an embedded BSSID or BSSID field only known by the STA 106 and providing this information to the STA 106 in an encrypted management frame), or in broadcast management frames (such as a Beacon, broadcast Probe Response, etc.) so that all STAs 106 that are associated to it, or that intend to associate with the AP 104 are aware of the embedded BSSID or the BSSID from which they can derive the embedded BSSID. The embedded BSSID may include, for example, 16 bits randomly selected by the AP 104 from the BSSID that identifies the BSS with which the receive STA 106 is associated, or from the BSSID that identifies a non-transmitted BSS when the BSS with which the STA 106 is associated belongs to a multiple BSSID set and the BSSID is not the transmitted BSSID. In some implementations, the AP 104 may select any value of 16-bits for the BSSID provided that the selected value is different from all other BSSs in the neighborhood. The AP 104 may request that the STAs 106 provide a reporting or listing of BSSIDs they see in their respective neighborhoods. Alternatively, the STAs 106 may report the observed BSSIDs without prompting by the AP 104. In some implementations, the reporting or listing of BSSIDs may utilize a mechanism similar to BSS color collision reports.

In some implementations, when the embedded BSSID field 1210 is not included in the WUR frame 1200b, the embedded BSSID may be obtained from the lowest significant bits (LSBs) of the BSSID. For example, the embedded BSSID may be the 16 LSBs (such as BSSID[32:47]) of the BSSID that identifies the BSS with which the STA 106 is associated. Alternatively, these 16 LSBs BSSID[32:47] may be from the BSSID that identifies the transmitted BSS when the BSS with which the STA 106 is associated belongs to a multiple BSSID set.

In some implementations, when the embedded BSSID field 1210 is not included in the WUR frame 1200b, the embedded BSSID may be a 16-bit field obtained by default from XORing the BSSID. For example, the embedded BSSID may be the 16 bits equal to a result of BSSID[0:15] XOR BSSID[16:31] XOR BSSID[32:47] of the BSSID that identifies the BSS with which the STA 106 is associated. Alternatively, the embedded BSSID may be from the BSSID, XORed as described above, that identifies the transmitted BSS when the BSS with which the STA 106 is associated belongs to a multiple BSSID set.

In some implementations, when the embedded BSSID field 1210 is not included in the WUR frame 1200b, the embedded BSSID may be obtained from a 48-bit BSSID. For example, the 48-bit BSSID may identify the BSS with which the STA 106 is associated. Alternatively, the 48-bit BSSID may be from the BSSID that identifies the transmitted BSS when the BSS with which the STA 106 is associated belongs to a multiple BSSID set.

In some implementations, the calculation fields are processed according to the order in which they are transmitted. In some implementations, the embedded BSSID may not be present as an independent field in the transmitted WUR frame. For example, the embedded BSSID may be embedded in one or more other fields in the WUR frame that is actually transmitted. Thus, though the WUR frame 1200a shows the embedded BSSID as an explicit field 1210, the embedded BSSID may actually be included in the calculation frames as part of, or embedded in, one or more of the fields that make up the calculation fields (such as the frame control field 910, the ID field 912, the TSD/TD control field 914, the payload or frame body portion 330).

Figure 13:
FIG. 13 illustrates a flowchart for an example method performed by a first device for generating a WUR frame for transmission to one or more devices.

FIG. 13 illustrates a flowchart for an example method 1300 performed by a first device for generating a WUR frame for transmission to one or more devices. In some implementations, the first device may be an AP (such as the AP 104), or may be a WLAN chip of an AP. The first device may communicate with one or more devices (such as one or more STAs 106). The method can be implemented in whole or in part by the devices described herein, such as the wireless device 202. Although the illustrated method is described herein with reference to a particular order, in some implementations, blocks herein can be performed in a different order, or omitted, and additional blocks can be added.

At block 1302 of FIG. 13, in some implementations, the first device may generate a WUR frame including a MAC header and an FCS having a CRC or an MIC. The FCS may be determined based, at least in part, on the MAC header and BSSID information associated with the first device.

In some implementations, the first device may hide, hash, scramble, or mask the BSSID information associated with the first device in the FCS when generating the value of the FCS. For example, the first device may determine the FCS based, at least in part, on the MAC header and the BSSID information.

Figure 14:
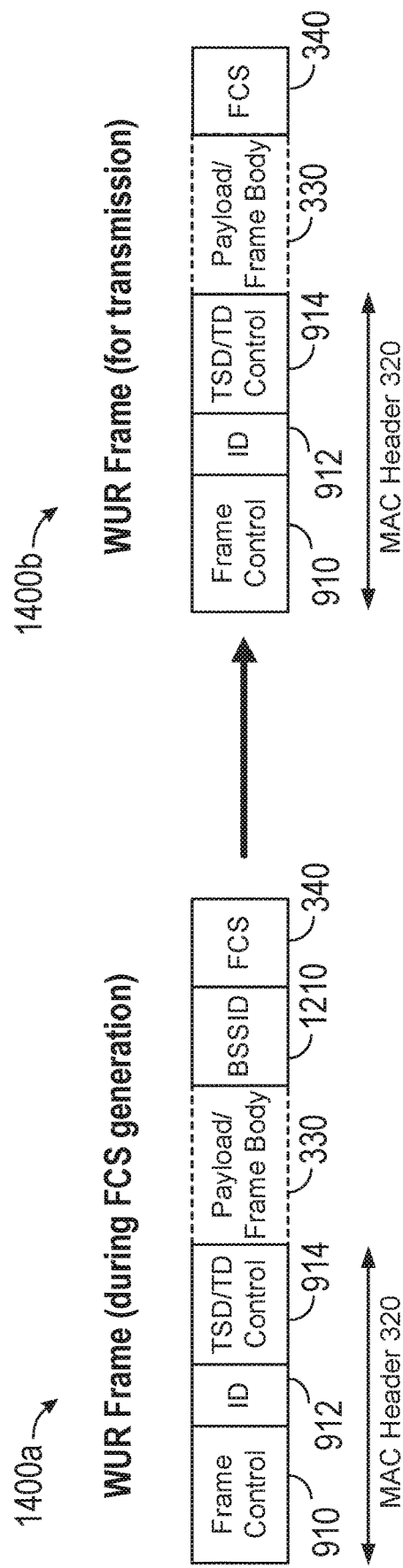
FIG. 14 illustrates an example WUR frame that is initially generated with the BSSID information for determining the FCS, and an example WUR frame that is outputted for transmission.

FIG. 14 illustrates an example WUR frame 1400a that may be initially generated with the BSSID information for determining the FCS 340, and an example WUR frame 1400b that is outputted for transmission. The WUR frame 1400a may initially include a MAC header 320 and the embedded BSSID field 1210. As described in FIGS. 9-12, the MAC header 320 may include a frame control field 910, an ID field 912, and a TSD/TD control field 914. In some implementations, the embedded BSSID field 1210 may include the BSSID information, which may be a portion of a BSSID associated with the first device (such as the 16 LSB or MSB bits of the BSSID), or a full BSSID associated with the first device. In some implementations, the BSSID information included in the embedded BSSID field 1210 may be obtained from a hash of the BSSID associated with the first device. For example, the value of the BSSID information included in the embedded BSSID field 1210 may be obtained from the output of a hash function that has the BSSID as the input. In some implementations, the first device may determine the FCS 340 based on the MAC header 320 and the embedded BSSID field 1210 using a polynomial (such as one of the various polynomials described in this disclosure). As described in FIG. 11, when the WUR frame 1400a is a protected frame, the first device may generate an MIC for the FCS 340. When the WUR frame is an unprotected frame, the first device may generate a CRC for the FCS 340. In some implementations, the FCS 340 may be a fixed length, such as a 16-bit FCS. In some implementations, the WUR frame 1400a may optionally include a payload or frame body field 330 (as shown in FIG. 14 by the dashed lines). When the WUR frame 1400a includes the payload or frame body field 330, the first device may determine the FCS 340 based on the MAC header 320, the payload or frame body field 330, and the embedded BSSID field 1210 using a polynomial.

In some implementations, the first device may assume the BSSID information is included in the WUR frame for calculating the value of the FCS. In some implementations, the first device may retrieve the BSSID information that is stored in the first device, and may hide, hash, scramble, or mask the BSSID information associated with the first device in the FCS when generating the value of the FCS. In some implementations, when the BSSID information is initially included in the embedded BSSID field 1210 for calculating the FCS (such as the FCS 340), the first device may remove the BSSID information from the WUR frame prior to outputting the WUR frame for transmission. For example, after generating and appending the FCS 340 to the WUR frame 1400a, the first device may remove the embedded BSSID field 1210 from the WUR frame 1400a, which results in the WUR frame 1400b that will be outputted for transmission. The WUR frame 1400b may include the MAC header 320 and the FCS 340. Similar to WUR frame 1400a, the MAC header 320 of WUR frame 1400b may include a frame control field 910, an ID field 912, and a TSD/TD control field 914. As described herein, in some implementations, the WUR frame 1400b may optionally include a payload or frame body field 330 (as shown in FIG. 14 by the dashed lines).

In some implementations, the first device may generate a sequence of bits to generate the WUR frame 1400a. For example, the first device may generate a sequence of bits that include at least a first set of bits for the MAC header 320 and a second set of bits for the embedded BSSID field 1210. The second set of bits may correspond to the BSSID information that may be included in the embedded BSSID field 1210. In some implementations, the first device may determine the FCS 340 based, at least in part, on at least the first set of bits for the MAC header 320 and the second set of bits for the embedded BSSID field 1210. The FCS may include a third set of bits. The first device may append the third set of bits for the FCS 340 to the sequence of bits for the WUR frame 1400a. Prior to outputting the WUR frame for transmission, the first device also may remove the second set of bits for the embedded BSSID field 1210 from the sequence of bits to generate the WUR frame 1400b. In some implementations, the WUR frame 1400a may optionally include a fourth set of bits for the payload or frame body field 330. When the WUR frame 1400a includes the payload or frame body field 330, the first device may determine the FCS 340 based on the first set of bits for the MAC header 320, the fourth set of bits for the payload or frame body field 330, and the second set of bits for the embedded BSSID field 1210. In some implementations, the first device may use the second set of bits associated with BSSID information to determine the FCS 340 without adding the second set of bits to the WUR frame (and, therefore, without removing the second set of bits prior to transmission). For example, the first device may retrieve the second set of bits associated with the BSSID information that is stored in the first device, and may use the second set of bits (in addition to the first set of bits of the MAC header 320) when generating the FCS 340. The first device may hide, hash, scramble, or mask the second set of bits associated with the BSSID information in the FCS when generating the value of the FCS.

In some implementations, the first device may initially determine the CRC or the MIC for the WUR frame, and then perform an operation on the CRC or the MIC using the BSSID information to generate the FCS for the WUR frame.

Figure 15:
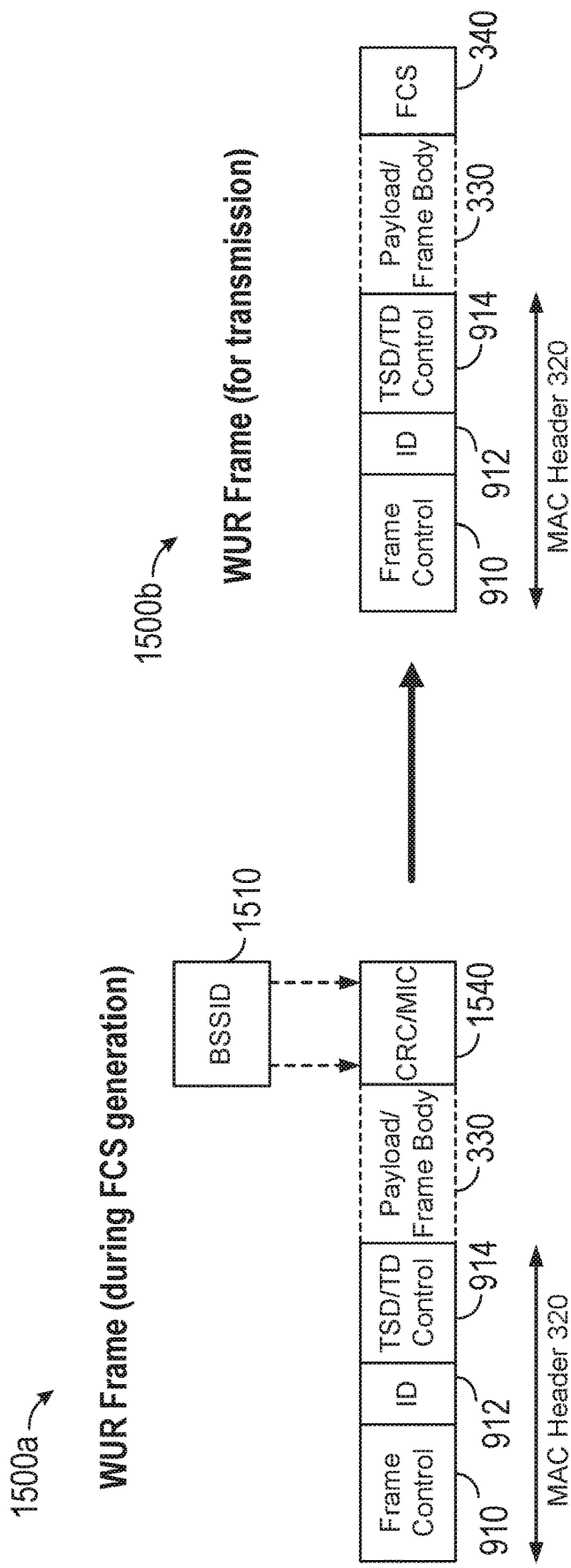
FIG. 15 illustrates an example WUR frame that is initially generated for use in determining the FCS, and an example WUR frame that is outputted for transmission.

FIG. 15 illustrates an example WUR frame 1500a that is initially generated for use in determining the FCS 340, and an example WUR frame 1500b that is outputted for transmission. The WUR frame 1500a may initially include the MAC header 320. As described in FIGS. 9-12, the MAC header 320 may include a frame control field 910, an ID field 912, and a TSD/TD control field 914. In some implementations, the first device may determine the CRC or the MIC (shown as CRC/MIC 1540) for the WUR frame 1500a based, at least in part, on the MAC header 320. The first device may then determine the BSSID information 1510 (which also may be referred to as the embedded BSSID field information) associated with the first device. The BSSID information 1510 may include a portion of a BSSID associated with the first device (such as the 16 LSB or MSB bits of the BSSID), or a full BSSID associated with the first device. In some implementations, the BSSID information 1510 may be obtained from a hash of the BSSID associated with the first device. For example, the value of the BSSID information may be obtained from the output of a hash function that has the BSSID as the input. The first device may determine the FCS 340 based, at least in part, on the CRC/MIC 1540 and the BSSID information 1510, which may result in the WUR frame 1500b that will be outputted for transmission. For example, the first device may generate the FCS 340 by hashing or scrambling the CRC/MIC 1540 with the BSSID information 1510. The first device may generate the FCS 340 by XORing the CRC/MIC 1540 with the BSSID information 1510. In some implementations, the WUR frame 1500a may optionally include a payload or frame body field 330 (as shown in FIG. 15 by the dashed lines). When the WUR frame 1500a includes the payload or frame body field 330, the first device may determine the CRC/MIC 1540 based on the MAC header 320 and the payload or frame body field 330.

In some implementations, prior to initiating the operations to generate the FCS, the first device may determine the frame type associated with the WUR frame. The first device may generate the FCS using the BSSID information when the WUR frame is one of a set of frame types. For example, the set of frame types that may use the BSSID information to generate the FCS may include a WUR Beacon frame and a WUR Wake-up frame. If the first device determines the frame type associated with the WUR frame is one of the set of frame types (such as the WUR Beacon frame or the WUR Wake-up frame), then the first device may determine the FCS using at least the BSSID information. For example, as described herein, the first device may determine the FCS based, at least in part, on the MAC header and the BSSID information associated with the first device. The first device may not use the BSSID information to determine the FCS when the frame type associated with the WUR frame is a WUR Discovery frame. In some implementations, depending on vendor specifications, another frame type referred to as the WUR Vendor Specific frame also may be part of the set of frame types that use the BSSID information to generate the FCS.

At block 1304 of FIG. 13, the first device may output the WUR frame for transmission to the one or more devices. For example, the WUR frame may be sent to the PHY layer to be embedded within a PPDU for transmission to one or more devices. The WUR frame (such as either the WUR frame 1400b or the WUR frame 1500b) that is outputted for transmission to the one or more devices may include the MAC header 320 and the FCS 340. As described herein, in some implementations, the WUR frame may optionally include the payload or frame body field 330.

In some implementations, the BSSID information associated with the first device includes a BSSID associated with the first device, or a portion of the BSSID associated with the first device. In some implementations, the first device may operate in a multiple BSSID mode, where the first device implements a transmitted BSSID and one or more non-transmitted BSSIDs. When the first device is operating in the multiple BSSID mode and the BSSID associated with the first device is part of a multiple BSSID set of the first device, the BSSID is the transmitted BSSID of the multiple BSSID set. In some implementations, the BSSID information is a function of the BSSID associated with the first device. For example, the BSSID information may be obtained from a hash of the BSSID associated with the first device. In some implementations, prior to generating the WUR frame, the first device may provide the BSSID information to the one or more devices. For example, the main radio of the first device may transit the BSSID information to the one or more devices during an association operation or during a negotiation of the WUR mode of operation. As described in FIG. 16, a receiving device may use the BSSID information to confirm a received WUR frame is directed to the receiving device.

Figure 16:
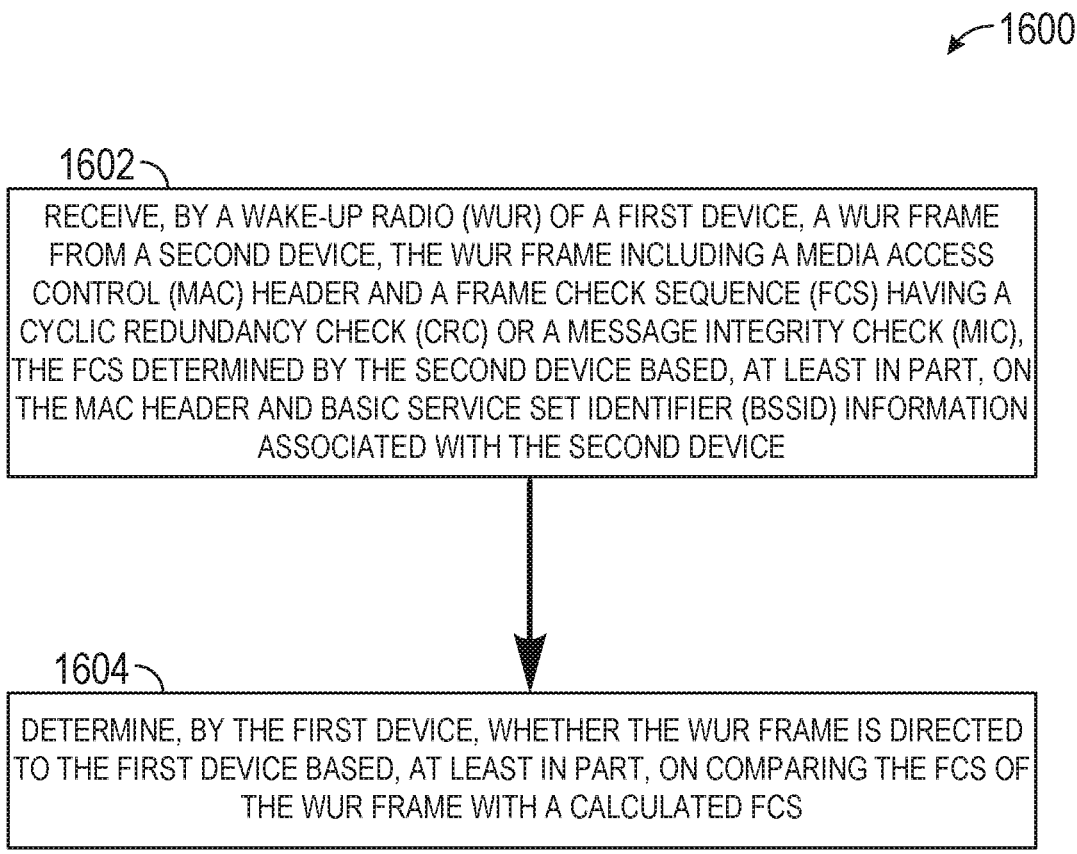
FIG. 16 illustrates a flowchart for an example method performed by a first device having a WUR for receiving and processing a WUR frame.

FIG. 16 shows a flowchart for an example method 1600 performed by a first device having a WUR for receiving and processing a WUR frame. In some implementations, the first device may be a STA (such as one of the STAs 106), or may be a WLAN chip of a STA. The first device may communicate with a second device (such as an AP 104). The method can be implemented in whole or in part by the devices described herein, such as the wireless device 202. Although the illustrated method is described herein with reference to a particular order, in some implementations, blocks herein can be performed in a different order, or omitted, and additional blocks can be added.

At block 1602 of FIG. 16, in some implementations, the first device may receive, via the WUR, a WUR frame from a second device. For example, the first device may receive the WUR frame embedded in a PPDU from the second device. In some implementations, the first device may receive the WUR frame 1400b (shown in FIG. 14) or the WUR frame 1500b (shown in FIG. 15). The WUR frame may include a MAC header and a FCS having a CRC or an MIC. The FCS may be determined by the second device based, at least in part, on the MAC header and BSSID information associated with the second device. As described in FIG. 11, the FCS may include an MIC when the WUR frame is a protected frame, and the FCS may include a CRC when the WUR frame is an unprotected frame.

At block 1604, the first device may determine whether the received WUR frame is directed to the first device based, at least in part, on comparing the FCS of the WUR frame with a calculated FCS. The first device may use information from the received WUR frame and stored BSSID information to determine the calculated FCS. The stored BSSID information may be BSSID information associated with the second device that is received from the second device and stored at the first device. For example, the stored BSSID information may be received from the main radio of the second device (such as the AP 104) during an association process or during a negotiation of the WUR mode of operation.

In some implementations, the first device may determine the calculated FCS based, at least in part, on the MAC header of the received WUR frame and the stored BSSID information. The first device may determine whether the FCS of the WUR frame matches the calculated FCS by comparing the FCS of the WUR frame with the calculated FCS. The first device may determine the WUR frame is directed to the first device in response to determining the FCS of the WUR frame matches the calculated FCS. The first device may determine the WUR frame is not directed to the first device in response to determining the FCS of the WUR frame does not match the calculated FCS. If the received WUR frame (transmitted by the second device) is directed to the first device, and if the first device previously received the stored BSSID from the second device, the first device will use the same BSSID information to determine the calculated FCS that the second device used to determine the FCS of the received WUR frame. In this case, the calculated FCS will match the FCS of the received WUR frame.

In some implementations, the WUR frame may optionally include a payload or frame body field. When the WUR frame includes the payload or frame body field, the first device may determine the calculated FCS based on the MAC header, the payload or frame body field, and the stored BSSID information.

In some implementations, the first device may generate a sequence of bits for comparing the FCS of the WUR frame with the calculated FCS. The sequence of bits may include at least a first set of bits for the MAC header of the WUR frame and a second set of bits for the stored BSSID information. The first device may generate the calculated FCS based, at least in part, on at least the first set of bits for the MAC header of the WUR frame and the second set of bits for the stored BSSID information. When the WUR frame includes the optional payload or frame body field, the first device may generate a sequence of bits that may include the first set of bits for the MAC header of the WUR frame, the second set of bits for the stored BSSID information, and a third set of bits for the payload or frame body field of the WUR frame. The first device may generate the calculated FCS based, at least in part, on the first set of bits for the MAC header of the WUR frame, the second set of bits for the stored BSSID information, and the third set of bits for the payload or frame body field of the WUR frame. The first device may compare the FCS of the WUR frame with the calculated FCS, as described herein.

In some implementations, the first device may determine the CRC, or the MIC based, at least in part, on the MAC header of the WUR frame. The first device may generate the calculated FCS based, at least in part, on the CRC or the MIC and the stored BSSID information. For example, the first device may generate the calculated FCS by hashing or scrambling the CRC or the MIC with the stored BSSID information. The first device may generate the calculated FCS by XORing the CRC or the MIC with the stored BSSID information. In some implementations, the WUR frame may optionally include a payload or frame body field. When the WUR frame includes the payload or frame body field, the first device may determine the CRC, or the MIC based, at least in part, on the MAC header of the WUR frame and the payload or frame body field of the WUR frame.

In some implementations, the stored BSSID information may include the BSSID associated with the second device, or a portion of the BSSID associated with the second device. In some implementations, if the second device is operating in a multiple BSSID mode and implements a transmitted BSSID and one or more non-transmitted BSSID, the BSSID information associated with the second device (and the stored BSSID information) may be the transmitted BSSID. When the first device is operating in the multiple BSSID mode and the BSSID associated with the first device is part of a multiple BSSID set of the first device, the BSSID is the transmitted BSSID of the multiple BSSID set. In some implementations, the first device (such as a STA) may be associated with a non-transmitted BSSID, and the second device (such as an AP) may have data associated with the non-transmitted BSSID to be sent to the STA. In this case, to avoid waking up other STAs that are associated with different BSSIDs, the second device may transmit a WUR frame to the STA that targets the non-transmitted BSSID, and thus the BSSID information associated with the second device (and the stored BSSID information) may be the non-transmitted BSSID.

Figure 17:
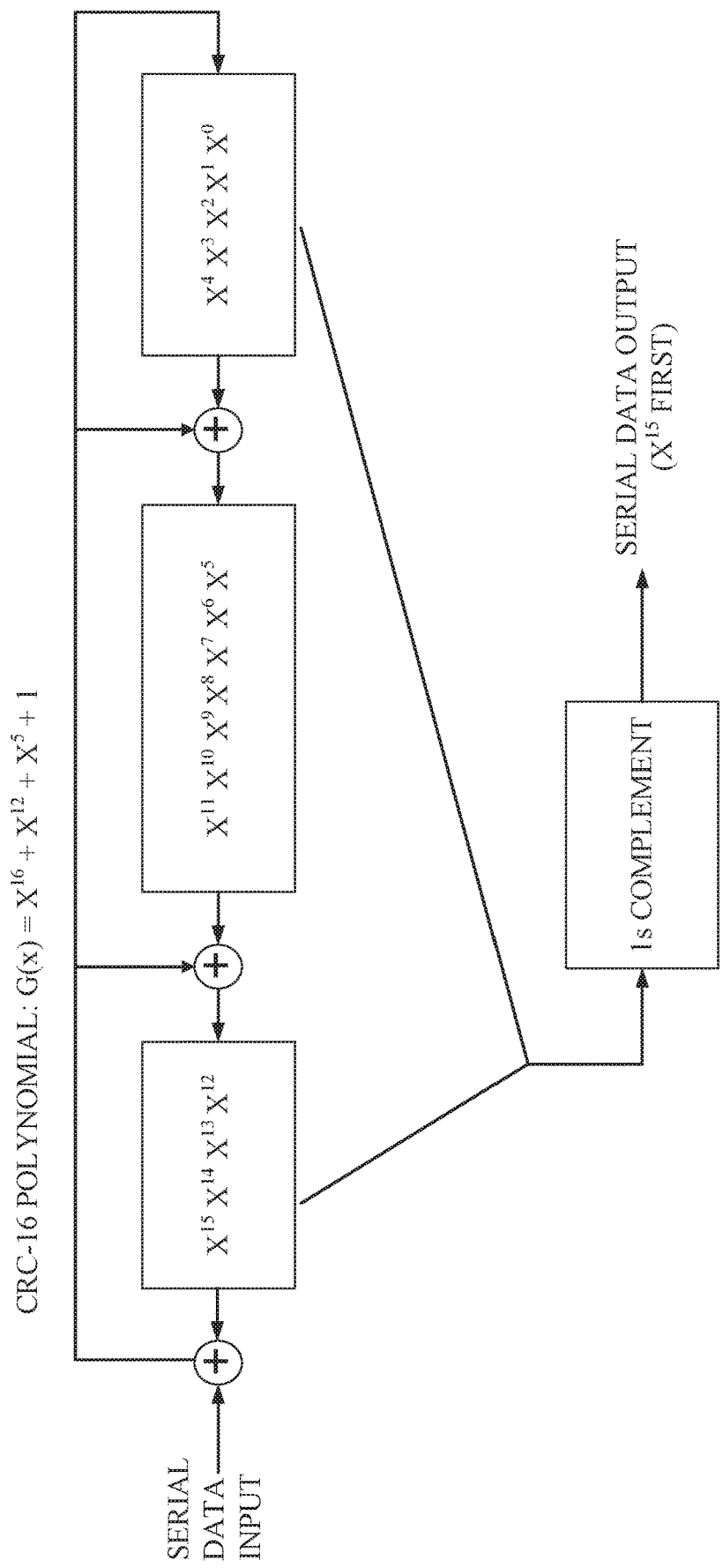
FIG. 17 illustrates details of an example processing flow for calculating the FCS for the WUR frame.

FIG. 17 illustrates details of an example processing flow for calculating the FCS for the WUR frame. In some implementations, when using a 16-bit polynomial, the FCS 340 may include a is compliment of a remainder generated by a modulo 2 division of the calculation fields by the polynomial $x^{16}+x^{12}+x^5+1$, where a shift-register state is preset to all is. In some implementations, the FCS 340 may include the is complement of the remainder generated by the modulo 2 division of the calculation fields by the corresponding 8, 24, or 32-bit polynomial.

As shown, a CRC-16 implementation includes a serial data input. In some implementations, the serial data input may consist of the calculation fields (($B_L, B_{L-1} \ldots, B_1, B_0$), with $B_L$ being the most significant bit of the calculation fields. In some implementations, the CRC-16 implementation may be replaced with one of a CRC-8, CRC-24, CRC-32, and CRC-64 implementation.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a first device for wireless communication with one or more devices, comprising:
   generating a wake-up radio (WUR) frame, the WUR frame including a media access control (MAC) header and a frame check sequence (FCS),
   wherein generating the WUR frame includes
   determining basic service set identifier (BSSID) information associated with the first device from a BSSID information field of the WUR frame,
   determining the FCS based, at least in part, on the MAC header and the BSSID information associated with the first device, and
   removing the BSSID information field having the BSSID information from the WUR frame prior to outputting the WUR frame for transmission; and
   outputting the WUR frame for transmission to the one or more devices, the WUR frame that is output for transmission including the MAC header and the FCS, and not including the BSSID information field having the BSSID information used for determining the FCS.

2. The method of claim 1, wherein the FCS includes a cyclic redundancy check (CRC) when the WUR frame is an unprotected frame.

3. The method of claim 1, wherein the FCS includes a message integrity check (MIC) when the WUR frame is a protected frame.

4. The method of claim 1, wherein generating and outputting the WUR frame further includes
   generating a sequence of bits for the WUR frame, the sequence of bits including at least a first plurality of bits for the MAC header and a second plurality of bits for the BSSID information associated with the first device,
   determining the FCS based, at least in part, on at least the first plurality of bits for the MAC header and the second plurality of bits for the BSSID information, the FCS including a third plurality of bits,
   appending the third plurality of bits for the FCS to the sequence of bits for the WUR frame, and
   outputting the WUR frame for transmission to the one or more devices, the WUR frame including the first plurality of bits for the MAC header and the third plurality of bits for the FCS, and not including the second plurality of bits for the BSSID information.

5. The method of claim 1, wherein generating the WUR frame further includes
   determining a CRC or a MIC based, at least in part, on the MAC header, and
   determining the FCS based, at least in part, on the CRC or the MIC and the BSSID information associated with the first device.

6. The method of claim 5, wherein determining the FCS based, at least in part, on the CRC or the MIC and the BSSID information associated with the first device includes
   generating the FCS by hashing the CRC or the MIC with at least a portion of the BSSID information.

7. The method of claim 5, wherein determining the FCS based, at least in part, on the CRC or the MIC and the BSSID information associated with the first device includes
   generating the FCS by XORing the CRC or the MIC with at least a portion of the BSSID information.

8. The method of claim 1, wherein the WUR frame includes:
   a data unit including the MAC header and the FCS, the MAC header including frame type information, address information, and control information; and
   a preamble including information for decoding the data unit,
   wherein the FCS is determined based, at least in part, on the frame type information, the address information, the control information, and the BSSID information associated with the first device.

9. The method of claim 8, wherein
   the data unit further includes a frame body, and
   the FCS is determined based, at least in part, on the frame type information, the address information, the control information, the frame body, and the BSSID information associated with the first device.

10. The method of claim 1, further comprising:
    determining the WUR frame is a first frame type of a plurality of frame type; and
    in response to determining the WUR frame is the first frame type,
    determining the FCS based, at least in part, on the MAC header and the BSSID information associated with the first device, and
    outputting the WUR frame for transmission to the one or more devices, the WUR frame that is output for transmission not including the BSSID information used for determining the FCS.

11. The method of claim 1, wherein the BSSID information associated with the first device includes a BSSID associated with the first device or a portion of the BSSID associated with the first device.

12. The method of claim 11, wherein the BSSID associated with the first device is a transmitted BSSID of a multiple BSSID set of the first device when the BSSID is part of the multiple BSSID set of the first device.

13. The method of claim 1, wherein the BSSID information is a function of the BSSID associated with the first device.

14. A method performed by a first device for wireless communication, the first device including a wake-up radio (WUR), comprising:
    receiving, via the WUR, a WUR frame from a second device, the WUR frame including a media access control (MAC) header and a frame check sequence (FCS), the WUR frame generated by the second device by
       determining basic service set identifier (BSSID) information associated with the second device from a BSSID information field of the WUR frame,
       determining the FCS based, at least in part, on the MAC header and the BSSID information associated with the second device, and
       removing the BSSID information field having the BSSID information from the WUR frame prior to outputting the WUR frame for transmission, the WUR frame not including the BSSID information field having the BSSID information used by the second device for determining the FCS; and
    determining whether the WUR frame is directed to the first device based, at least in part, on comparing the FCS of the WUR frame with a calculated FCS.

15. The method of claim 14, wherein
    the FCS includes a cyclic redundancy check (CRC) when the WUR frame is an unprotected frame, and
    the FCS includes a message integrity check (MIC) when the WUR frame is a protected frame.

16. The method of claim 14, further comprising:
    determining the calculated FCS based, at least in part, on the MAC header of the WUR frame and stored BSSID information that is stored at the first device.

17. The method of claim 16, wherein determining whether the WUR frame is directed to the first device based, at least in part, on comparing the FCS of the WUR frame with the calculated FCS includes
    determining whether the FCS of the WUR frame matches the calculated FCS by comparing the FCS of the WUR frame with the calculated FCS,
    determining the WUR frame is directed to the first device in response to determining the FCS of the WUR frame matches the calculated FCS, and
    determining the WUR frame is not directed to the first device in response to determining the FCS of the WUR frame does not match the calculated FCS.

18. The method of claim 16, wherein determining the calculated FCS based, at least in part, on the MAC header of the WUR frame and the stored BSSID information includes generating a sequence of bits for comparing the FCS of the WUR frame with the calculated FCS, the sequence of bits including at least a first plurality of bits for the MAC header of the WUR frame and a second plurality of bits for the stored BSSID information, generating the calculated FCS based, at least in part, on at least the first plurality of bits for the MAC header of the WUR frame and the second plurality of bits for the stored BSSID information, and comparing the FCS of the WUR frame with the calculated FCS.

19. The method of claim 16, wherein the stored BSSID information is received by the first device from a main radio of the second device, the stored BSSID information including a BSSID associated with the second device or a portion of the BSSID associated with the second device.

20. The method of claim 19, wherein the BSSID associated with the second device is a transmitted BSSID of a multiple BSSID set of the second device when the BSSID is part of the multiple BSSID set of the second device.

21. The method of claim 16, wherein the stored BSSID information is a function of the BSSID associated with the second device.

22. The method of claim 14, wherein determining whether the WUR frame is directed to the first device based, at least in part, on comparing the FCS of the WUR frame with the calculated FCS includes
　determining a CRC or a MIC based, at least in part, on the MAC header of the WUR frame,
　generating the calculated FCS based, at least in part, on the CRC or the MIC and stored BSSID information,
　determining whether the FCS of the WUR frame matches the calculated FCS by comparing the FCS of the WUR frame with the calculated FCS,
　determining the WUR frame is directed to the first device in response to determining the FCS of the WUR frame matches the calculated FCS, and
　determining the WUR frame is not directed to the first device in response to determining the FCS of the WUR frame does not match the calculated FCS.

23. The method of claim 22, wherein generating the calculated FCS based, at least in part, on the CRC or the MIC and the stored BSSID information includes generating the calculated FCS by hashing the CRC or the MIC with the stored BSSID information.

24. A first device comprising:
　a processor configured to generate a wake-up radio (WUR) frame, the WUR frame including a media access control (MAC) header and a frame check sequence (FCS), wherein the generation of the WUR frame includes
　　a determination of basic service set identifier (BSSID) information associated with the first device from a BSSID information field of the WUR frame,
　　a determination of the FCS based, at least in part, on the MAC header and the BSSID information associated with the first device, and
　　a removal of the BSSID information field having the BSSID information from the WUR frame prior to output of the WUR frame for transmission; and
　an interface coupled with the processor, the interface configured to output the WUR frame for transmission to one or more devices, the WUR frame that is output for transmission including the MAC header and the FCS, and not including the BSSID information field having the BSSID information used for determining the FCS.

25. The first device of claim 24, wherein the processor is further configured to:
　determine a CRC or a MIC based, at least in part, on the MAC header, and
　determine the FCS based, at least in part, on the CRC or the MIC and the BSSID information associated with the first device.

26. A first device comprising:
　a wake-up radio (WUR) configured to receive a WUR frame from a second device, the WUR frame including a media access control (MAC) header and a frame check sequence (FCS), wherein a generation of the WUR frame by the second device includes
　　a determination of basic service set identifier (BSSID) information associated with the second device from a BSSID information field of the WUR frame,
　　a determination of the FCS by the second device based, at least in part, on the MAC header and the BSSID information associated with the second device,
　　a removal of the BSSID information field having the BSSID information from the WUR frame prior to output of the WUR frame for transmission, the WUR frame not including the BSSID information field having the BSSID information used by the second device for determining the FCS; and
　a processor coupled with the WUR, the processor configured to
　　determine whether the WUR frame is directed to the first device based, at least in part, on a comparison of the FCS of the WUR frame with a calculated FCS.

27. The first device of claim 26, wherein the processor configured to determine whether the WUR frame is directed to the first device based, at least in part, on the comparison of the FCS of the WUR frame with the calculated FCS further includes the processor configured to
　determine the calculated FCS based, at least in part, on the MAC header of the WUR frame and stored BSSID information that is stored at the first device,
　determine whether the FCS of the WUR frame matches the calculated FCS based on a comparison of the FCS of the WUR frame with the calculated FCS,
　determine the WUR frame is directed to the first device in response to a determination that the FCS of the WUR frame matches the calculated FCS, and
　determining the WUR frame is not directed to the first device in response to a determination that the FCS of the WUR frame does not match the calculated FCS.

28. The first device of claim 26, wherein the processor configured to determine whether the WUR frame is directed to the first device based, at least in part, on the comparison of the FCS of the WUR frame with the calculated FCS further includes the processor configured to
　determine a CRC or a MIC based, at least in part, on the MAC header of the WUR frame,
　generate the calculated FCS based, at least in part, on the CRC or the MIC and stored BSSID information,
　determine whether the FCS of the WUR frame matches the calculated FCS based on a comparison of the FCS of the WUR frame with the calculated FCS,
　determine the WUR frame is directed to the first device in response to a determination that the FCS of the WUR frame matches the calculated FCS, and
　determining the WUR frame is not directed to the first device in response to a determination that the FCS of the WUR frame does not match the calculated FCS.

\* \* \* \* \*